United States Patent
Lum

(10) Patent No.: US 12,261,708 B2
(45) Date of Patent: *Mar. 25, 2025

(54) VIDEO CONFERENCE AUTOMATIC SPOTLIGHTING

(71) Applicant: Zoom Communications, Inc., San Jose, CA (US)

(72) Inventor: Samuel Lum, Sunnyvale, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,205

(22) Filed: Oct. 25, 2023

(65) Prior Publication Data

US 2024/0056325 A1    Feb. 15, 2024

Related U.S. Application Data

(63) Continuation of application No. 18/068,236, filed on Dec. 19, 2022, now Pat. No. 11,863,306, which is a continuation of application No. 17/390,236, filed on Jul. 30, 2021, now Pat. No. 11,558,209.

(51) Int. Cl.
  *H04L 12/18*    (2006.01)
  *G06F 18/2431*    (2023.01)

(52) U.S. Cl.
  CPC ...... *H04L 12/1818* (2013.01); *G06F 18/2431* (2023.01); *H04L 12/1822* (2013.01)

(58) Field of Classification Search
  CPC ............. H04L 12/1818; H04L 12/1822; G06F 18/2431
  See application file for complete search history.

(56) References Cited

U.S. PATENT DOCUMENTS

| | | |
|---|---|---|
| 6,680,745 B2 | 1/2004 | Center, Jr. et al. |
| 8,436,888 B1 | 5/2013 | Baldino et al. |
| 8,842,161 B2 | 9/2014 | Feng et al. |
| 9,445,050 B2 | 9/2016 | Travis et al. |
| 9,467,657 B2 | 10/2016 | Decker et al. |
| 9,491,374 B1 | 11/2016 | Avrahami et al. |
| 9,641,585 B2 | 5/2017 | Kvaal et al. |
| 9,751,212 B1 | 9/2017 | Martinson et al. |
| 9,756,286 B1 | 9/2017 | Faulkner |
| 9,883,143 B2 | 1/2018 | Tangeland et al. |
| 10,079,995 B1 | 9/2018 | Ahnoff et al. |
| 2008/0218582 A1 | 9/2008 | Buckler |
| 2009/0063995 A1 | 3/2009 | Baron et al. |
| 2010/0095318 A1 | 4/2010 | Wagner |

(Continued)

FOREIGN PATENT DOCUMENTS

| | | |
|---|---|---|
| EP | 2179586 A1 | 4/2010 |
| KR | 101262734 B1 | 5/2013 |

*Primary Examiner* — Nazia Naoreen

(74) *Attorney, Agent, or Firm* — Young Basile Hanlon & MacFarlane, P.C.

(57) ABSTRACT

Automatic spotlighting of participant video feeds in a video conference are based on one or more triggers detected in the participant video feeds. Participant video feeds are added to a spotlight video queue. The participant video feeds are elevated to an active spotlight status based on certain criteria. The participant video feeds that are elevated to the active spotlight status are displayed adjacent to a host video feed on a display.

20 Claims, 18 Drawing Sheets

(56) References Cited

U.S. PATENT DOCUMENTS

| | | | |
|---|---|---|---|
| 2011/0035373 A1* | 2/2011 | Berg | G06F 16/7834 |
| | | | 707/723 |
| 2011/0285809 A1 | 11/2011 | Feng et al. | |
| 2012/0046993 A1 | 2/2012 | Hill | |
| 2012/0169838 A1 | 7/2012 | Sekine | |
| 2013/0097635 A1 | 4/2013 | Yerli | |
| 2013/0106988 A1 | 5/2013 | Davis et al. | |
| 2013/0129192 A1* | 5/2013 | Wang | H04N 13/111 |
| | | | 382/154 |
| 2014/0104373 A1 | 4/2014 | Kato et al. | |
| 2014/0359483 A1* | 12/2014 | Forutanpour | G06F 16/58 |
| | | | 715/753 |
| 2014/0362170 A1 | 12/2014 | Walker | |
| 2015/0043886 A1 | 2/2015 | Bang et al. | |
| 2015/0161147 A1* | 6/2015 | Zhao | G06F 16/7837 |
| | | | 382/190 |
| 2015/0201161 A1 | 7/2015 | Lachapelle et al. | |
| 2016/0050391 A1 | 2/2016 | Schultz et al. | |
| 2016/0295169 A1 | 10/2016 | Hiller et al. | |
| 2016/0359941 A1 | 12/2016 | Kvaal et al. | |
| 2017/0308164 A1 | 10/2017 | Kim et al. | |
| 2017/0353508 A1 | 12/2017 | Yoakum | |
| 2018/0068188 A1* | 3/2018 | Peng | G06T 7/97 |
| 2018/0236304 A1 | 8/2018 | Onoda | |
| 2018/0241882 A1 | 8/2018 | Lee et al. | |
| 2018/0288354 A1 | 10/2018 | Anderson et al. | |
| 2019/0215464 A1 | 7/2019 | Kumar et al. | |
| 2020/0344278 A1 | 10/2020 | Mackell et al. | |
| 2020/0403816 A1 | 12/2020 | Daredia et al. | |
| 2021/0076002 A1 | 3/2021 | Peters et al. | |
| 2021/0076080 A1 | 3/2021 | Yoo et al. | |
| 2021/0200500 A1 | 7/2021 | Merkel et al. | |
| 2021/0400142 A1 | 12/2021 | Jorasch et al. | |
| 2022/0272255 A1 | 8/2022 | Xiong et al. | |
| 2022/0309936 A1 | 9/2022 | Jang et al. | |

* cited by examiner

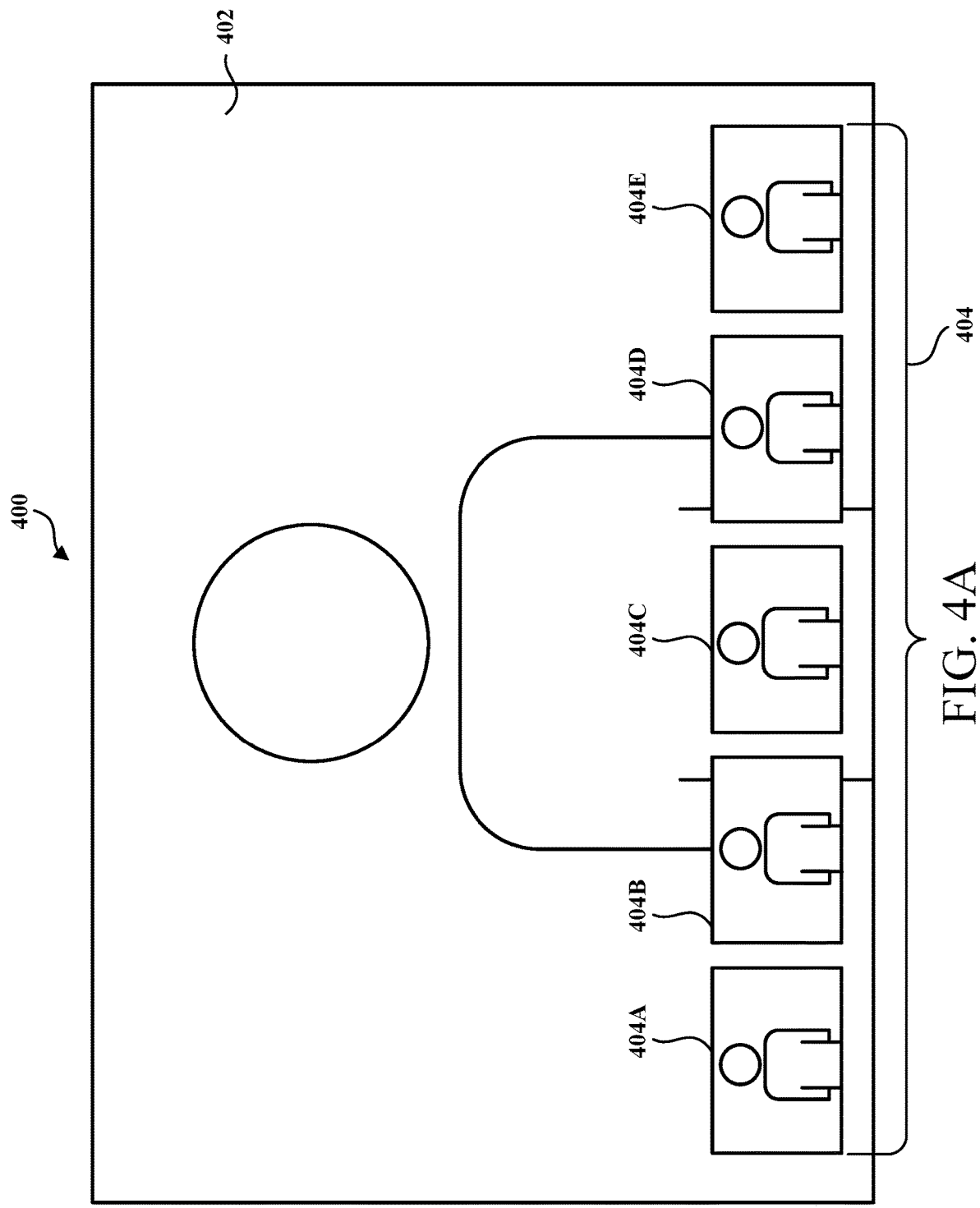

VIDEO CONFERENCE AUTOMATIC SPOTLIGHTING

CROSS-REFERENCE TO RELATED APPLICATION(S)

This application is a continuation of U.S. patent application Ser. No. 18/068,236, filed Dec. 19, 2022, which is a continuation of U.S. patent application Ser. No. 17/390,236, filed Jul. 30, 2021, the entire disclosures of which are hereby incorporated by reference.

BACKGROUND

Conference software helps people all around the world to connect with one another every day in a variety of business and personal settings. A conference implemented over conference software may be video-enabled to allow participants to see each other in real-time and may also accommodate participants interacting with others through audio alone. Conference platforms use network connections with participant devices to facilitate audio and/or video communications between participants. The growing ubiquity of network-connected devices enables more and more people to communicate over conferences every day.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4A is a diagram of an example of a user interface output to a display showing a video conference.

DETAILED DESCRIPTION

Figure 1:
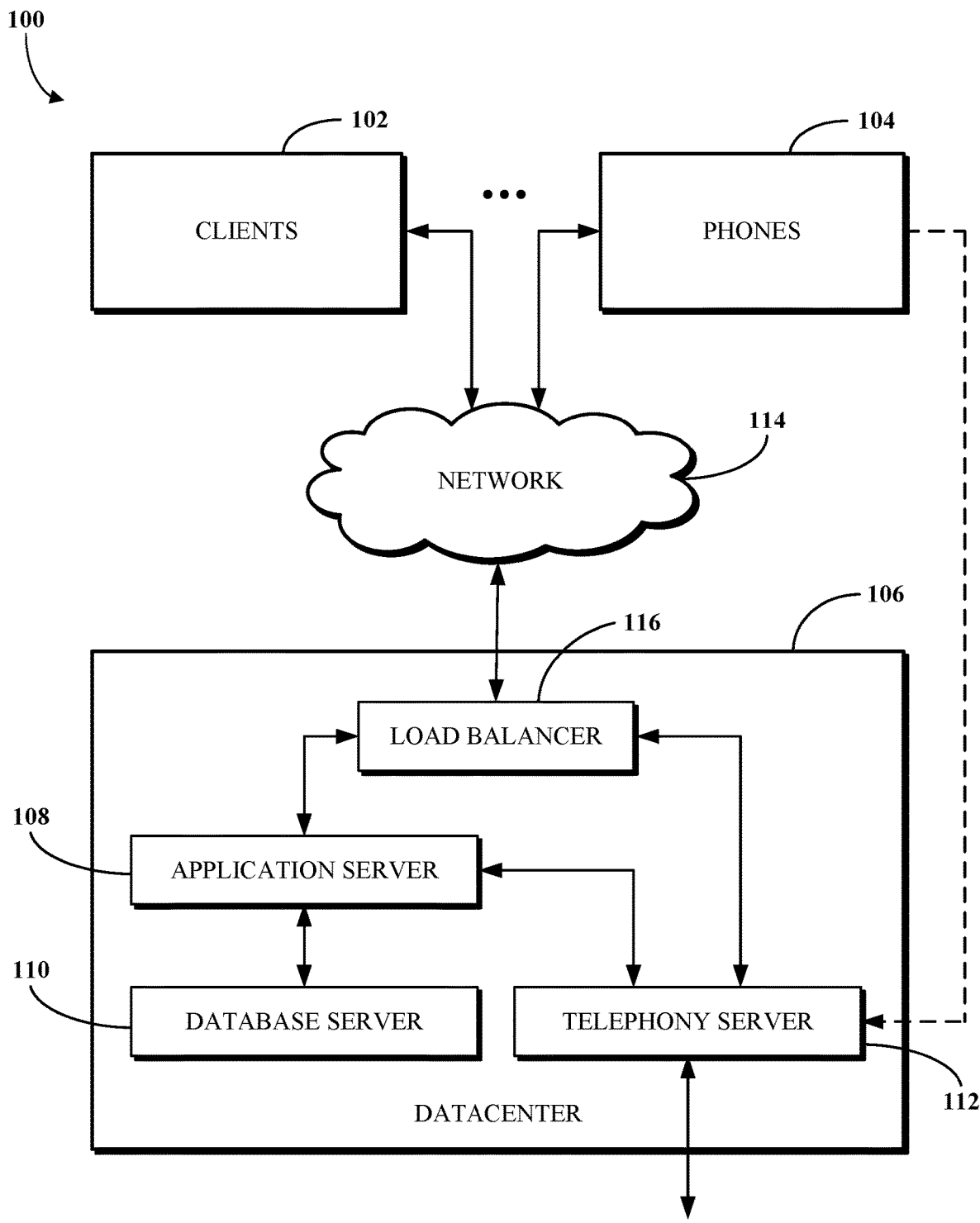
FIG. 1 is a block diagram of an example of an electronic computing and communications system.

Disclosed herein are, inter alia, implementations of systems and techniques for automatic spotlighting in video conferencing.

One aspect of this disclosure is a method that includes detecting activity in a participant video feed of a video conference. The method may include determining an activity relevance score corresponding to the detected activity. The method may include adding the participant video feed to a spotlight queue if the activity relevance score is above a relevance threshold. The method may include elevating the participant video feed from an inactive spotlight status to an active spotlight status. The method may include displaying the participant video feed adjacent to a host video feed on a display.

Another aspect of this disclosure is a video conference system that includes a server, a host device, and a participant device. The host device may be configured to transmit a host video feed to the server. The participant device may be configured to transmit a participant video feed to the server. The server may be configured to detect activity in the participant video feed. The server may be configured to determine an activity relevance score corresponding to the detected activity. The activity relevance score may indicate how relevant the activity is to conference participants. The server may be configured to add the participant video feed to a spotlight queue if the activity relevance score is above a relevance threshold. The server may be configured to elevate the participant video feed from an inactive spotlight status to an active spotlight status. The server may be configured to display the participant video feed adjacent to the host video feed.

Another aspect of this disclosure is a non-transitory computer-readable medium configured to store machine-readable instructions that when executed by a processor, cause the processor to sample a participant video feed of a spotlight queue. The processor may be configured to determine a relevance score of the participant video feed. The processor may be configured to elevate the participant video feed to an active spotlight status based on the relevance score. The processor may be configured to display the participant video feed adjacent to a host video feed.

Another aspect of this disclosure is a non-transitory computer-readable medium configured to store machine-readable instructions that when executed by a processor, cause the processor to sample a participant video feed of a spotlight queue. The participant video feed may be sampled based on an activity of the participant video feed. The processor may be configured to determine a relevance score of the participant video feed. The processor may be configured to update the participant video feed to an active spotlight status based on the relevance score. The processor may be configured to display the participant video feed adjacent to a host video feed.

Another aspect of this disclosure is a method that includes sampling a participant video feed of a spotlight queue. The participant video feed may be sampled based on an activity of the participant video feed. The method may include determining a relevance score of the participant video feed. The method may include updating the participant video feed to an active spotlight status based on the relevance score. The method may include displaying the participant video feed adjacent to a host video feed.

Another aspect of this disclosure is a video conference system that includes a server, a host device, and a participant device. The host device may be configured to transmit a host video feed to the server. The participant device may be configured to transmit a participant video feed to the server. The server may be configured to sample the participant video feed based on an activity of the participant video feed associated with the spotlight queue. The server may be configured to determine a relevance score of the participant video feed. The server may be configured to update the participant video feed to an active spotlight status based on the relevance score. The server may be configured to display the participant video feed adjacent to a host video feed.

In one or more aspects, the processor may be configured to classify the activity. In one or more aspects, the activity may be classified based on a comparison of the activity to a stored database of activities. In one or more aspects, the processor may be configured to determine an activity relevance score corresponding to the activity. In one or more aspects, the activity relevance score may indicate how relevant the activity is to conference participants. In one or more aspects, the activity relevance score may be based on a correlation of a participant activity in the participant video feed relative to a host activity in the host video feed. In one or more aspects, the processor may be configured to initiate a timer when the participant video feed is displayed adjacent to the host video feed. In one or more aspects, the processor may be configured to demote the participant video feed from the activity spotlight status when the timer expires. In one or more aspects, a second activity may be detected in a second participant video feed. In one or more aspects, a second relevance score may be determined that corresponds to the second detected activity. In one or more aspects, the second participant video feed may be added to the spotlight queue when the second activity relevance score is above a threshold. In one or more aspects, the second participant video feed may be updated to the active spotlight status. In one or more aspects, the activity relevance score may be compared to the second activity relevance score. In one or more aspects, the second participant video feed may be added to the spotlight queue below the participant video feed when the activity relevance score is above the second activity relevance score. In one or more aspects, the activity relevance score may be based on a correlation of a first object activity in the participant video feed relative to a second object activity in the host video feed. In one or more aspects, a determination of whether the activity is valid may be made based on a duration of the activity. In one or more aspects, the participant video feed may be updated to the active spotlight status based on a determination that the activity is valid. In one or m ore aspects, a determination may be made as to whether the activity is valid based on a dynamic threshold associated with a number of participant video feeds that have detected activity. In one or more aspects, the spotlight queue may include multiple participant feeds, and two of the multiple participant feeds that have been in the spotlight queue the longest are updated to the active spotlight status. In one or more aspects, two of the multiple participant feeds that have the highest activity relevance scores may be updated to the active spotlight status.

Conference platforms allow a video conference host to manually spotlight a participant video feed to indicate that the participant is a focal point of the video conference. Manually spotlighting participants requires the host to divert his attention to select participant video feeds that may enhance the content of the video conference. Since the attention of the host is diverted, the content of the video conference can suffer, which can lead to an undesirable experience for the conference participants. Typically, the host would have to designate a secondary person to control the manual spotlight. In many cases, the host may not have a secondary person available to handle the task of monitoring the participant video feeds, determining which participant video feeds are interesting or relevant to conference participants, and selecting the participant video feeds that are interesting or relevant to conference participants for display in the video conference. Implementations of this disclosure address problems such as these by providing methods and systems to automatically select participant video feeds for display in a video conference based on one or more triggers detected in the participant video feeds.

Conference platforms that have a multi-camera setup allow a video conference host to manually spotlight a host video feed by selecting a camera feed that he deems as interesting or relevant to the conference participants. Manually selecting a host video feed requires the host to divert his attention to select a host video feed that may enhance the content of the video conference. Since the attention of the host is diverted, the content of the video conference can suffer, which can lead to an undesirable experience for the conference participants. Typically, the host would have to designate the secondary person to control the manual spotlight. In many cases, the host may not have a secondary person available to handle this task. In an example where the conference is an online cooking show, where there may be a camera focused on a cutting board or cooking surface, and another camera focused on the host, a secondary person, such as a producer, is needed to control the manual spotlight during a specific segment of the show to highlight relevant and interesting content for the video conference participants. Implementations of this disclosure address problems such as these by providing methods and systems to automatically select a host video feed in a video conference based on one or more triggers detected in the host video feeds.

The implementations of this disclosure are described in context of a cooking show for simplicity and clarity, and it is understood that the automatic spotlight methods and systems may be used in any scenario where there are multiple cameras at one location such that the camera that is recording the most relevant or interesting content is automatically spotlighted. The automatic spotlight methods and systems may be used in a scenario where there are multiple locations and a single camera at each location such that the camera that is recording the most relevant or interesting content is automatically spotlighted. The automatic spotlight methods and systems may be used in a scenario where there are multiple locations and multiple cameras at each location such that the camera that is recording the most relevant or interesting content is automatically spotlighted. In addition to the cooking show context, the automatic spotlight methods and systems may be used in other demonstrative show settings, educational settings, such as a webinar or classroom, or a team-based competition setting, such as a team-building exercise.

To describe some implementations in greater detail, reference is first made to examples of hardware and software structures used to implement automatic spotlight methods and systems for video conferencing. FIG. 1 is a block diagram of an example of an electronic computing and communications system 100, which can be or include a distributed computing system (e.g., a client-server computing system), a cloud computing system, a clustered computing system, or the like. The system 100 connects various clients 102 and/or phones 104 to services implemented within or otherwise using a datacenter 106. The system 100 can connect a number of clients 102 and/or phones 104 or can have a configuration of clients or phones different from that generally illustrated in FIG. 1. For example, and without limitation, the system 100 can connect hundreds or thousands of clients and/or phones.

A client 102 may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a device. In some implementations, a client can be implemented as a single physical unit or as a combination of physical units. In some implementations, a single physical unit can include multiple clients.

A phone 104 may be or otherwise refer to one or both of a phone device or a phone application such as a softphone. For example, a phone 104 may be a smart phone or other cell phone which may or may not be configured to run mobile applications, such as a client 102. In another example, a phone 104 may be a desk phone, such as a desktop unit configured to at least send and receive calls and includes an input device for receiving a telephone number or extension to dial to and an output device for outputting audio and/or video for a call in progress. In yet another example, the phone 104 may be a softphone representing telephony functionality of a client 102. A phone 104 may or may not be voice over IP (VOID)-enabled.

The datacenter 106 includes one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers.

The datacenter 106 includes servers used for implementing software services. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106.

In some implementations, one or more of the servers 108 112 can be a non-hardware aspect implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to the clients 102 and at least partially to the phones 104. The software services may be or include conference software which enables audio, video, and/or other forms of conferences between multiple devices (e.g., between ones of the clients 102, between ones of the phones 104, or between ones of the clients 102 and ones of the phones 104), such as to facilitate a conference between the users of those devices. The conference software can include functionality for hosting, presenting scheduling, joining, or otherwise participating in a conference. The conference software may further include functionality for recording some or all of a conference and/or documenting a transcript for the conference. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client 102 as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client 102. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to ones of the clients 102 and ones of the phones 104 which are VOIP-enabled devices configured to send and receive calls over a network, for example, a network 114. In particular, the telephony server 112 includes a session initiation protocol (SIP) zone and a web zone. The SIP zone enables a client 102 or a VOIP-enabled phone 104, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client 102 or VOIP-enabled phone 104 and directs same to a destination device. The SIP zone may include one or more call switches for routing the telephony traffic. For example, to route a VOIP call from a first VOIP-enabled client to a second VOIP-enabled client within the same domain or network, the telephony server 112 may initiate a SIP transaction between a first client and the second client using a PBX. However, in another example, to route a VOIP call from a VOIP-enabled client to a client or phone which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between ones of the clients 102 and/or between ones of the phones 104. When incoming telephony traffic for delivery to a client 102 or a phone 104 originating from outside the telephony server 112 is received, a SBC receives the traffic and forwards it to a call switch for routing to the client 102 or the phone 104.

The web zone receives telephony traffic from a client 102 or a phone 104, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 102 and the phones 104 communicate with aspects of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof. In some implementations in which one or more of the phones 104 is not a VOIP-enabled device, those one or more phones 104 may communicate other than via the network 114.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 102, by the application server 108, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106.

Figure 2:
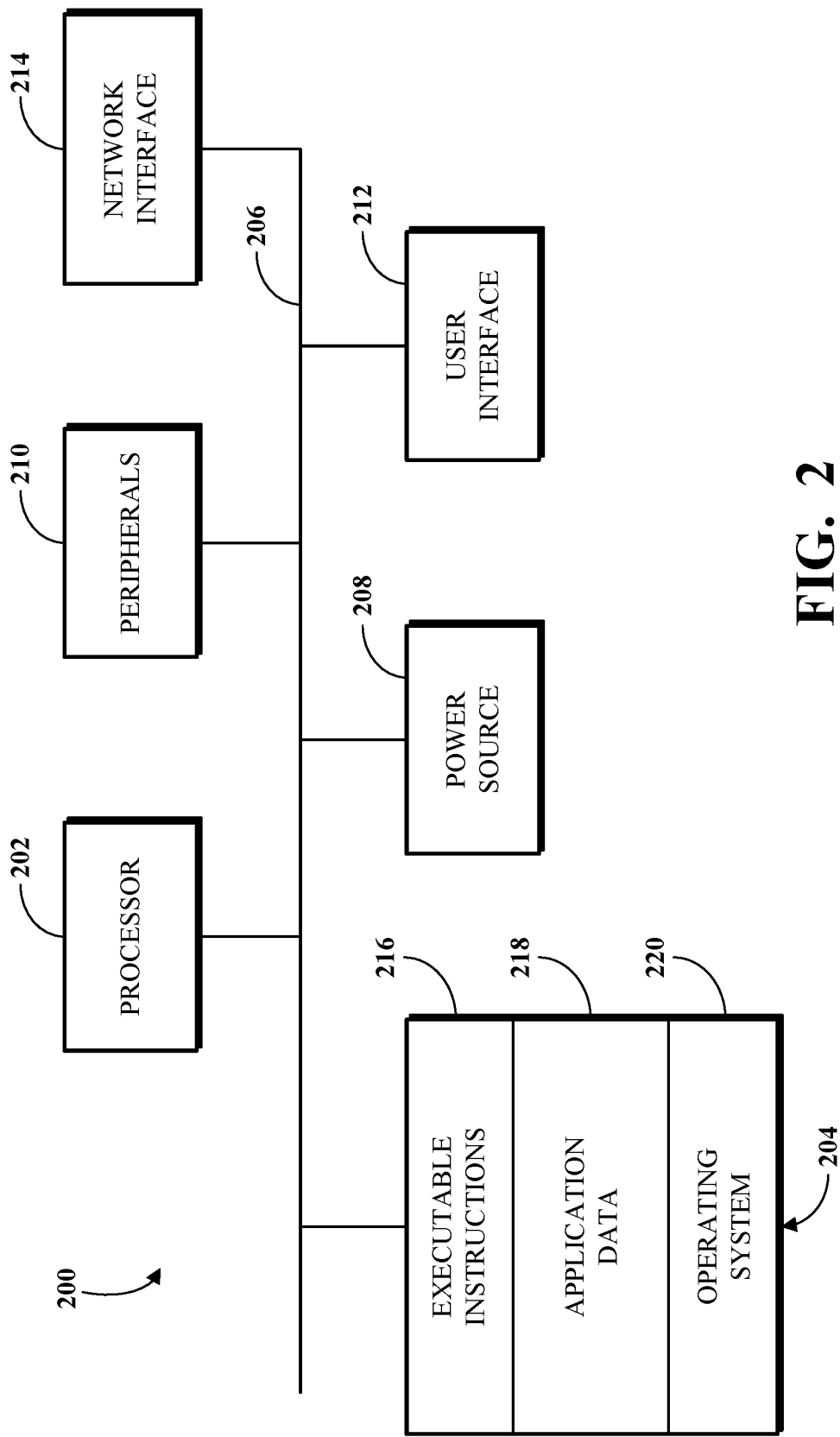
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the gateway 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee), infrared, visible light, general packet radio service (GPRS), global system for mobile communications (GSM), code-division multiple access (CDMA), Z-Wave, another protocol, or a combination thereof.

Figure 3:
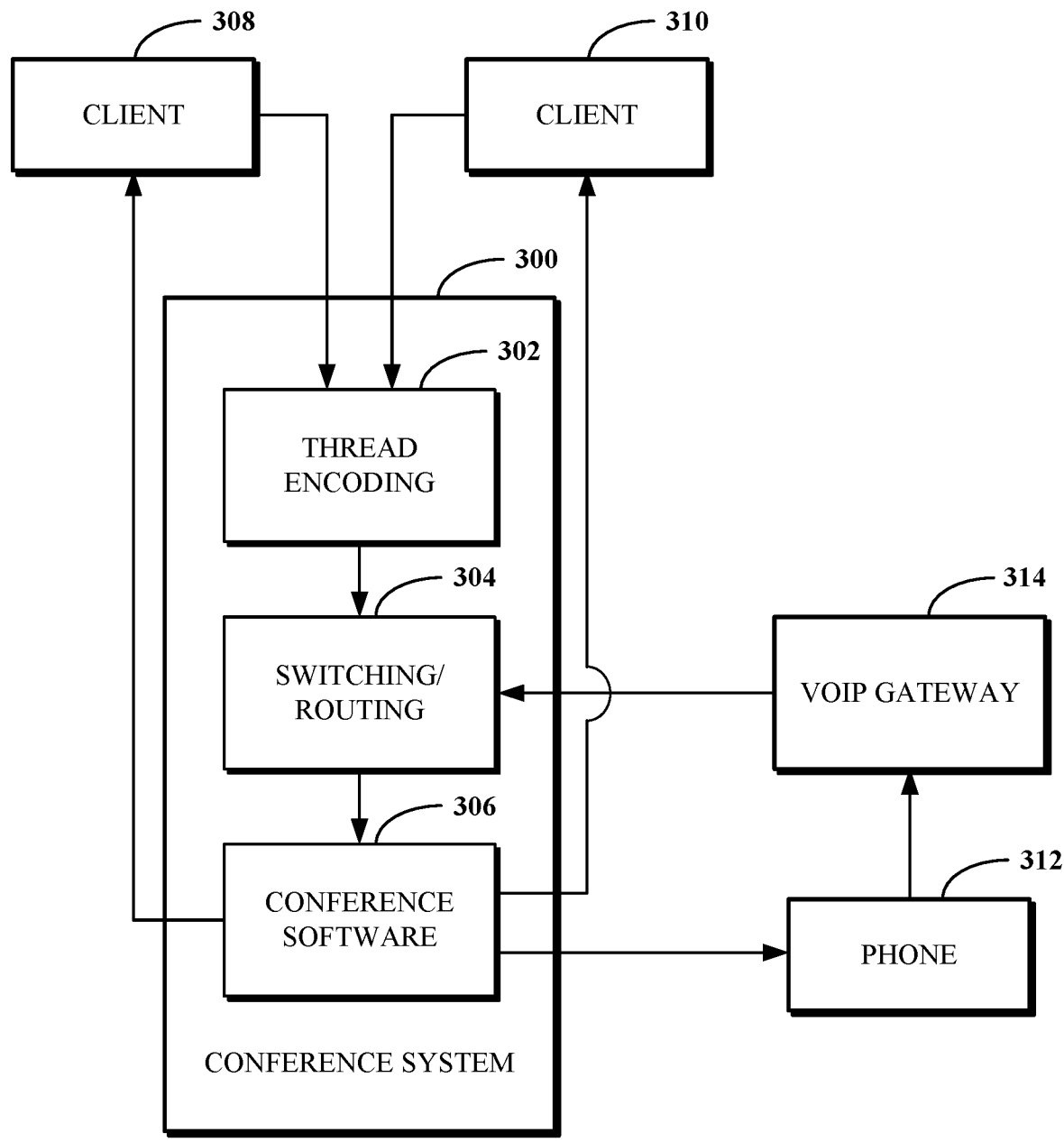
FIG. 3 is a block diagram of an example of a conference system for delivering conference software services in an electronic computing and communications system.

FIG. 3 is a block diagram of an example of a conference system 300 for delivering conference software services in an electronic computing and communications system, for example, the system 100 shown in FIG. 1. The conference system 300 includes a thread encoding tool 302, a switching/routing tool 304, and conference software 306. The conference system 300 enables use of the conference software 306 by clients and phones, such as clients 308 and 310 and phone 312. For example, one or both of the clients 308 or 310 may be a client 102 shown in FIG. 1. In another example, the phone 312 may be a phone 104 shown in FIG. 1. The conference system 300 may be implemented using one or more servers of the system 100. Although two clients and a phone are shown in FIG. 3, other numbers of clients and/or other numbers of phones can connect to the conference system 300.

A conference includes transmitting and receiving video, audio, and/or other data between clients and/or phones of conference participants. Each of the client 308, the client 310, and the phone 312 may connect through the conference system 300 using separate input streams to enable users thereof to participate in a conference together using the conference software. The conference software 306 is software for implementing conferences between users of two or more clients and/or phones. For example, the conference software 306 can be the conference software described above with respect to the application server 108 of FIG. 1.

The conference software 306 includes a dedicated conference view for each input stream received and processed at the conference system 300. For example, a conference view may be represented within a graphical user interface (GUI) of the conference software 306 by a dedicated box for a given participant. The content of the conference view for a given participant may be dependent upon the source of the input stream for that participant. For example, where a participant accesses the conference software 306 from a client, such as the client 308 or 310, the conference view for the participant may include a video output stream transmitted from the conference system for viewing by all participants based on a video input stream received from the client, although the participant may optionally disable video features to suspend the video output stream from being presented in the conference view. In another example, where a participant accesses the conference software 306 from a phone, such as the phone 312, the conference view for the participant may be limited to a static image or other default background aspect since there is no video output stream produced for that participant.

The thread encoding tool 302 receives video input streams separately from the clients 308 and 310 and encodes those video input streams using one or more transcoding tools, such as to produce variant streams at different resolutions. The video input streams may be received over a network, for example, the network 114 shown in FIG. 1, or by a direct wired connection, such as using a universal serial bus (USB) connection or like coupling aspect. After the video input streams are encoded, the switching/routing tool 304 direct the encoded streams through applicable network infrastructure and/or other hardware to deliver the encoded streams to the conference software 306. The conference software 306 delivers output video streams representative of the respective encoded streams to each connected client, such as the clients 308 and 310, which receive and decode the output video streams to output them for display by video output components of the clients, such as within respective conference views of the conference software 306.

A user of the phone 312 participates in the conference using an audio-only connection and may thus be referred to an audio-only caller. To participate in the conference from the phone 312, an audio signal from the phone 312 is received and processed at a VOIP gateway 314 to prepare a digital telephony signal for processing at the conference system 300. The VOIP gateway 314 may be part of the system 100, for example, implemented at or in connection with a server of the datacenter 106. Alternatively, the VOIP gateway 314 may be located on the user-side, such as in a same location as the phone 312. The digital telephony signal is a packet switched signal transmitted to the switching/routing tool 304 for delivery to the conference software 306. The conference software 306 outputs an audio signal representing a combined audio capture for each participant of the conference for output by an audio output component of the phone 312. In some implementations, the VOIP gateway 314 may be omitted, for example, where the phone 312 is a VOIP-enabled phone.

A conference may be referred to as a video-enabled conference in which video streaming is enabled for one or more participants. The enabling of video streaming for a participant of a conference does not require that the participant activate or otherwise use video functionality for participating in the conference. For example, a conference may still be a video-enabled conference where none of the participants joining using clients turns on their video feed for any portion of the conference. In some cases, however, the conference may have video disabled, such as where each participant connects to the conference using a phone rather than a client, or where a host of the conference selectively configures the conference to exclude video functionality.

In some implementations, other software services may be accessible in connection with a conference implemented using the conference system 300. For example, a conference may include or otherwise integrate functionality for instant messaging, unified messaging, and other types of messaging communications between participants of the conference, such as to facilitate a chat or like virtual conversation between users of those participants. Those other software services may be implemented at the conference system 300 and/or a different aspect of the system 100.

FIG. 4A is a diagram of an example of a user interface output 400 to a display showing a video conference. The user interface output 400 may be displayed on a component of a client or a device, such as client 102 or phones 104 shown in FIG. 1, or clients 308, 310 and phone 312 shown in FIG. 3. In this example, the display 400 includes a host video feed 402 and an automatic spotlight queue 404. The automatic spotlight queue 404 is an area of the display that contains participant video feeds that have the potential to be elevated to an active spotlight status. A conference system, such as conference system 300 shown in FIG. 3, may monitor the participant video feeds in the automatic spotlight queue 404 to determine which participant video feeds should be elevated to an active spotlight status. As shown in FIG. 4A, the automatic spotlight queue 404 includes participant video feeds 404A-404E. Although the automatic spotlight queue 404 is shown at the bottom of the display, the automatic spotlight queue 404 may be at the top of the display, the left side of the display, the right side of the display, or any combination thereof.

The participant video feeds 404A-404E may be automatically added to the automatic spotlight queue 404 based on motion detection, object detection, or both. Once in the automatic spotlight queue 404, the display areas of the participant video feeds 404A-404E are monitored for activity, such as one or more gestures, facial expressions, movements, or the like, detected in the host video feed 402, specific objects based on one or more detected objects in the host video feed 402, or both. A conference system, such as the conference system 300 shown in FIG. 3, may determine a relevance score for each of the participant video feeds 404A-404E, for example, based on a correlation of an activity of a participant or an object in a participant video feed to an activity of the host or an object in the host video feed 402, an identification of an object in the participant video feed, or any combination thereof. The relevance score may be an indication of how relevant the activity is to conference participants. The participant video feeds 404A-404E may be displayed based on a relevance score, for example, a participant video feed may be displayed in the automatic spotlight queue 404 if the associated relevance score meets a threshold. In the example shown in FIG. 4A, the participant video feeds 404A-404E may be displayed from highest relevance score to lowest relevance score, where participant video feed 404A has the highest relevance score and participant video feed 404E has the lowest relevance score. The automatic spotlight queue 404 may include any number of participant video feeds. Although FIG. 4A shows a single row of participant video feeds, some implementations may include multiple rows of participant video feeds, and each row may include any number of participant video feeds.

Figure 4B:
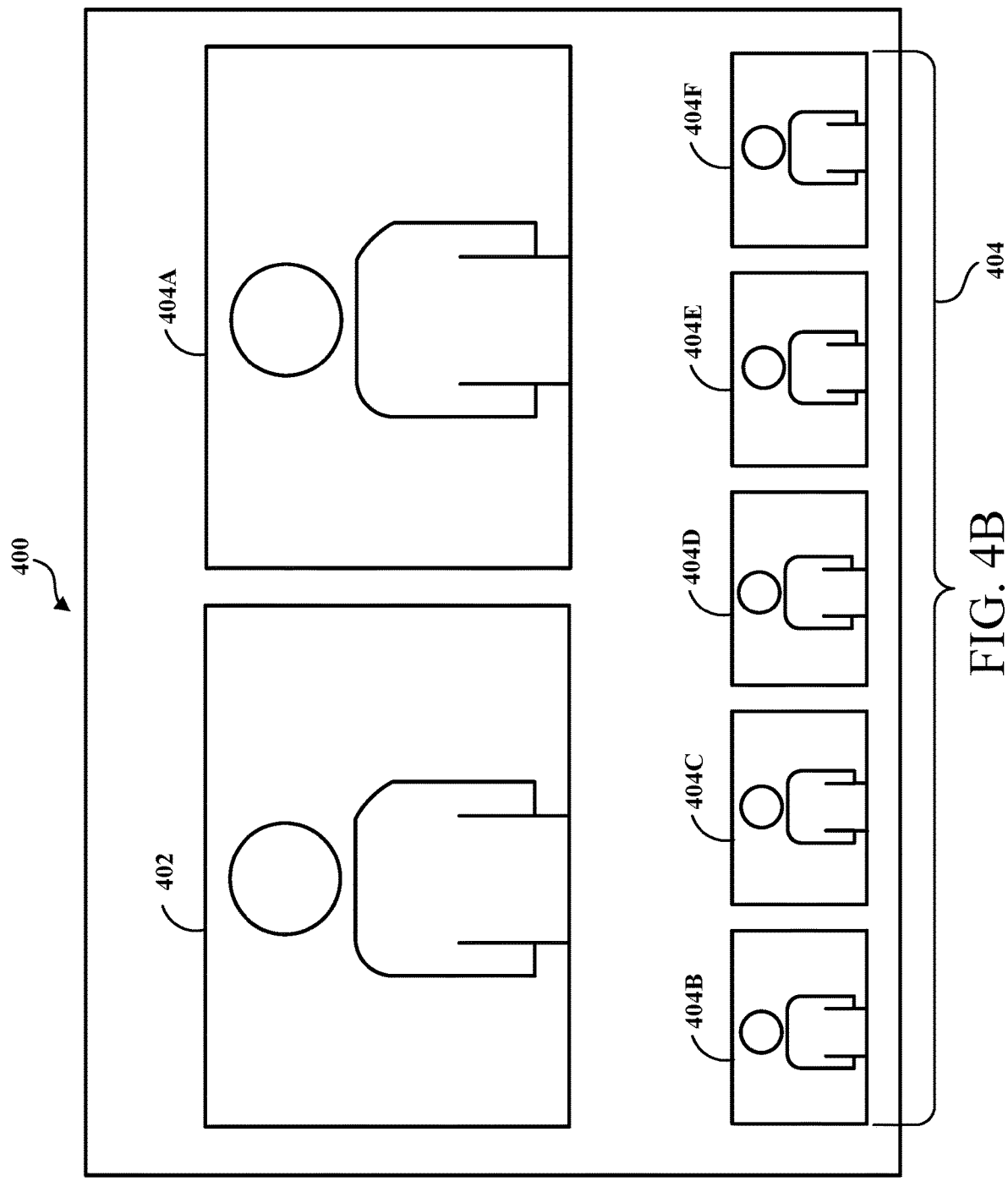
FIG. 4B is a diagram of an example of a user interface output to a display showing an automatic spotlight of a participant video feed in a video conference.

FIG. 4B is a diagram of an example of the user interface output 400 to a display showing an automatic spotlight of a participant video feed in a video conference. This example shows one participant video feed being elevated to an automatic spotlight status, however, in some examples, multiple participant video feeds may be elevated to the automatic spotlight status concurrently. In this example, the participant video feed 404A has the highest relevance score, and therefore is automatically spotlighted and elevated to an active spotlight status, where the participant video feed 404A is removed from the spotlight queue 404 and elevated to an area of the display adjacent to the host video feed 402. In some examples, the participant video feed that is in the spotlight queue the longest may be elevated to the active spotlight status. When the participant video feed 404A is elevated to the active spotlight status, the conference system is configured to automatically resize the participant video feed 404A and the host video feed 402. In some examples, elevation of a participant video feed to an active spotlight status may be based on a threshold. For example, the participant video feed may be elevated to the active spotlight status when the relevance score meets a threshold value. The threshold value may be a correlation value between the host video feed 402 and a participant video feed, and may be expressed as a percent correlation. An example threshold value may be a 70 percent correlation of an object detected in the host video feed 402 and a participant video feed. The threshold value may be a host configurable setting that can be set based on a host preference of system sensitivity to elevate a participant video feed to the active spotlight status. In some examples, more than one participant video feed may be elevated to an active spotlight status simultaneously. In the example shown in FIG. 4B, when the participant video feed 404A is elevated to the active spotlight status, another participant video feed 404F may be added to the automatic spotlight queue 404.

Figure 4C:
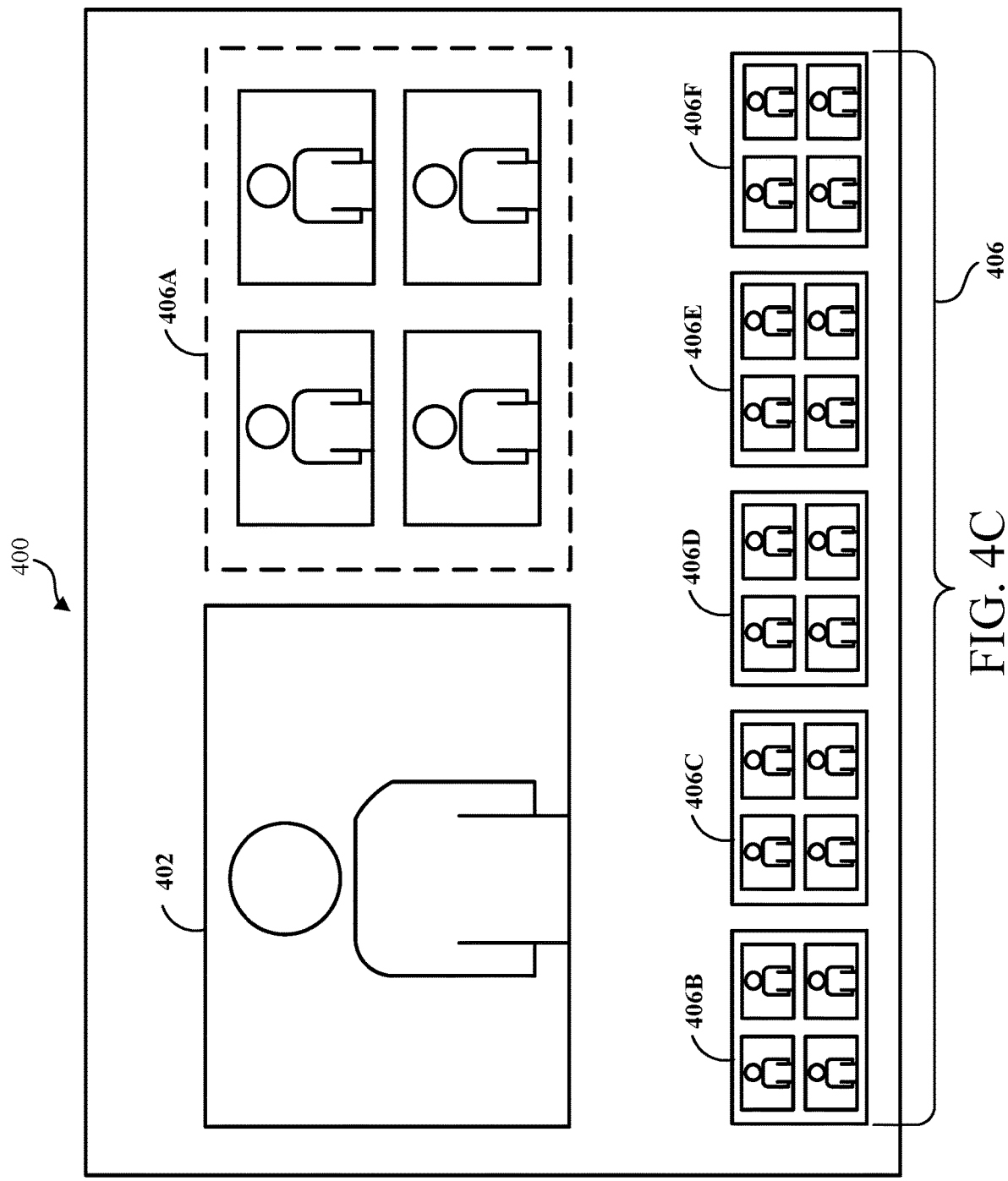
FIG. 4C is a diagram of an example of a user interface output to a display showing an automatic spotlight of a team video feed in a video conference.

FIG. 4C is a diagram of an example of a user interface output 400 to a display showing an automatic spotlight of a team video feed in a video conference. In this example, groups of participants may be assigned a team and placed in pods 406A-406F. Each of the pods 406A-406F include participant video feeds of each participant assigned to the respective pod. A relevance score may be determined for each pod 406A-406F. The relevance score may be a collective score of all the participants in a pod. The collective score may be a total summed value of the relevance scores of all the participants in a pod. Alternatively, the collective score may be an averaged value of the relevance scores of all the participants in a pod. In the example shown in FIG. 4C, the pod 406A has the highest relevance score, and therefore is automatically spotlighted and elevated to an active spotlight status, where the pod 406A is removed from the spotlight queue 404 and elevated to an area of the display adjacent to the host video feed 402. When the pod 406A is elevated to the active spotlight status, the conference system is configured to automatically resize the pod 406A and the host video feed 402. In some examples, elevation of a participant video feed to an active spotlight status may be based on a threshold, for example, the pod may be elevated to the active spotlight status when the relevance score meets a threshold value. The threshold value may be a correlation value between the host video feed 402 and one or more participant video feeds of a pod, and may be expressed as a percent correlation. An example threshold value may be a 70 percent correlation of an object detected in the host video feed 402 and one or more participant video feeds of the pod. The threshold value may be a host configurable setting that can be set based on a host preference of system sensitivity to elevate participant video feeds of the pod to the active spotlight status. In some examples, more than one pod may be elevated to an active spotlight status simultaneously. In the example shown in FIG. 4C, when the pod 406A is elevated to the active spotlight status, another pod 406F may be added to the automatic spotlight queue 404.

In another example, a pod may be elevated to the active spotlight status such that it replaces the host video feed 402. In this example, the active spotlight status may be based on a relevance score of the pod and a specific participant video feed of the pod. In this example, the specific participant video feed of the pod may be determined to be particularly relevant or interesting and elevated to the active spotlight status such that the specific participant video feed is removed from the pod and displayed adjacent to the pod on the display. The specific participant video feed may be selected for active spotlighting based on a determination that the relevance score for that specific participant video feed is the highest amongst the participant video feeds of the pod.

Figure 5:
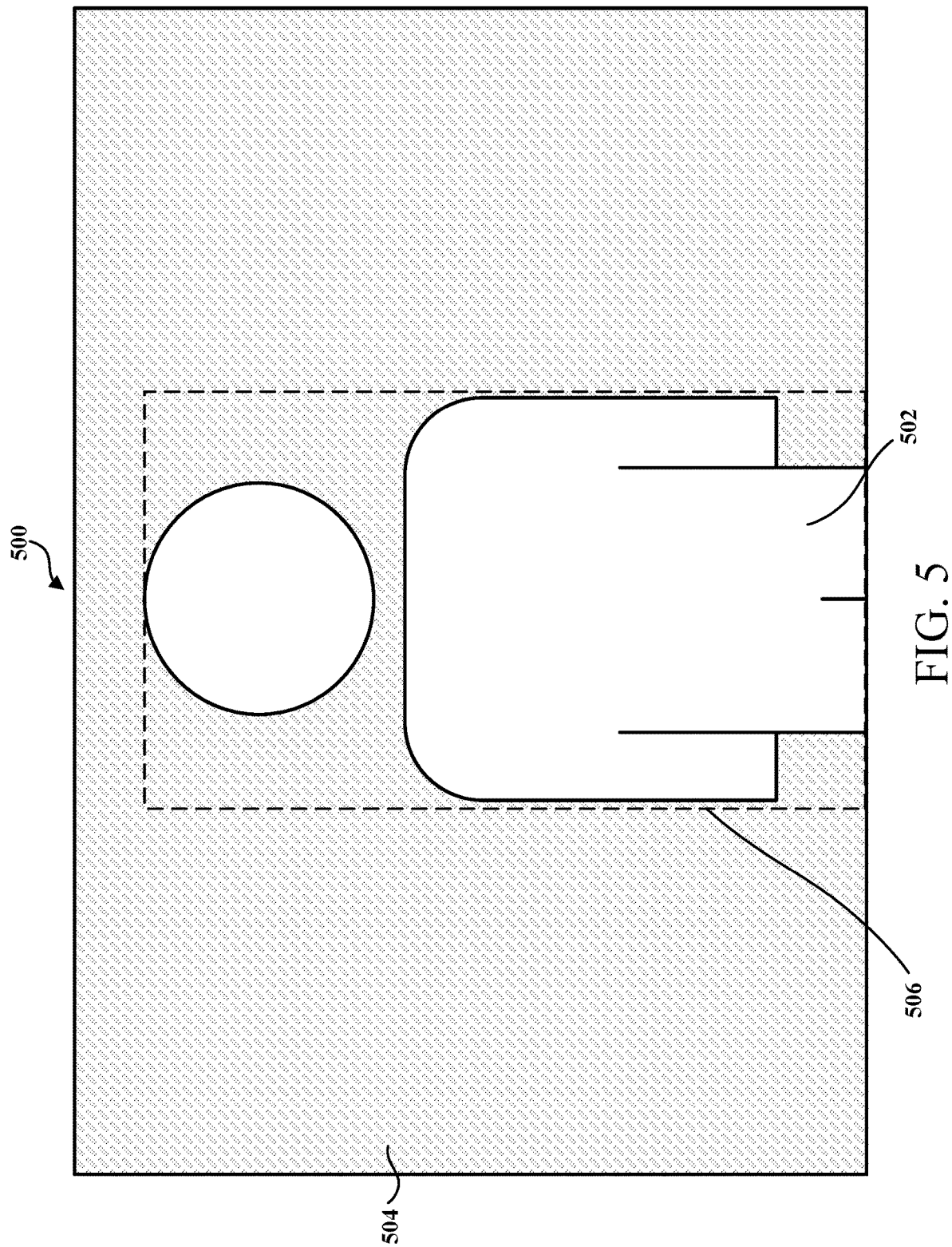
FIG. 5 is a diagram of an example of foreground detection in a frame of a video feed for automatic spotlighting of a participant video feed and dynamic video feed positioning.

FIG. 5 is a diagram of an example of foreground detection in a frame 500 of a video feed for automatic spotlighting of a participant video feed and dynamic video feed positioning. The foreground detection may use an artificial intelligence (AI) algorithm to detect a foreground object 502, such as a host, a participant, or another object, in a frame of a host video feed, a participant video feed, or both. The background 504 is shown in the shaded portion of a display area of the frame 500 of the video feed. In some examples, objects in the background 504 may not be detected or tracked. The foreground detection includes detecting one or more portions of a body, such as a head, shoulders, arms, torso, or legs in the video feed, and may be based on a color map to identify areas of the display that are occupied by the one or more portions of the body. In some examples, a dynamic bounding box 506 may be drawn around a foreground object. The dynamic bounding box 506 may be used to track the movement of an object in a video feed. The dynamic bounding box 506 may be automatically resized and/or relocated within the frame 500 based on a motion of the respective object and proximity to the camera. For example, if the host is the object and extends his arm, the dynamic bounding box will automatically resize to include the extended arm to indicate the increased area of the object relative to the frame 500. The foreground detection may include detecting and tracking one or more objects in a video feed. The output of the foreground detection AI algorithm may be used with an object/motion detection AI algorithm to determine a relevance score for a participant video feed, where the relevance score may be based on a correlation of an activity of a participant or movement of an object in the participant video feed to an activity of the host or movement of an object in the host video feed. The relevance score may be an indication of how relevant the activity is to conference participants.

Figure 6A:
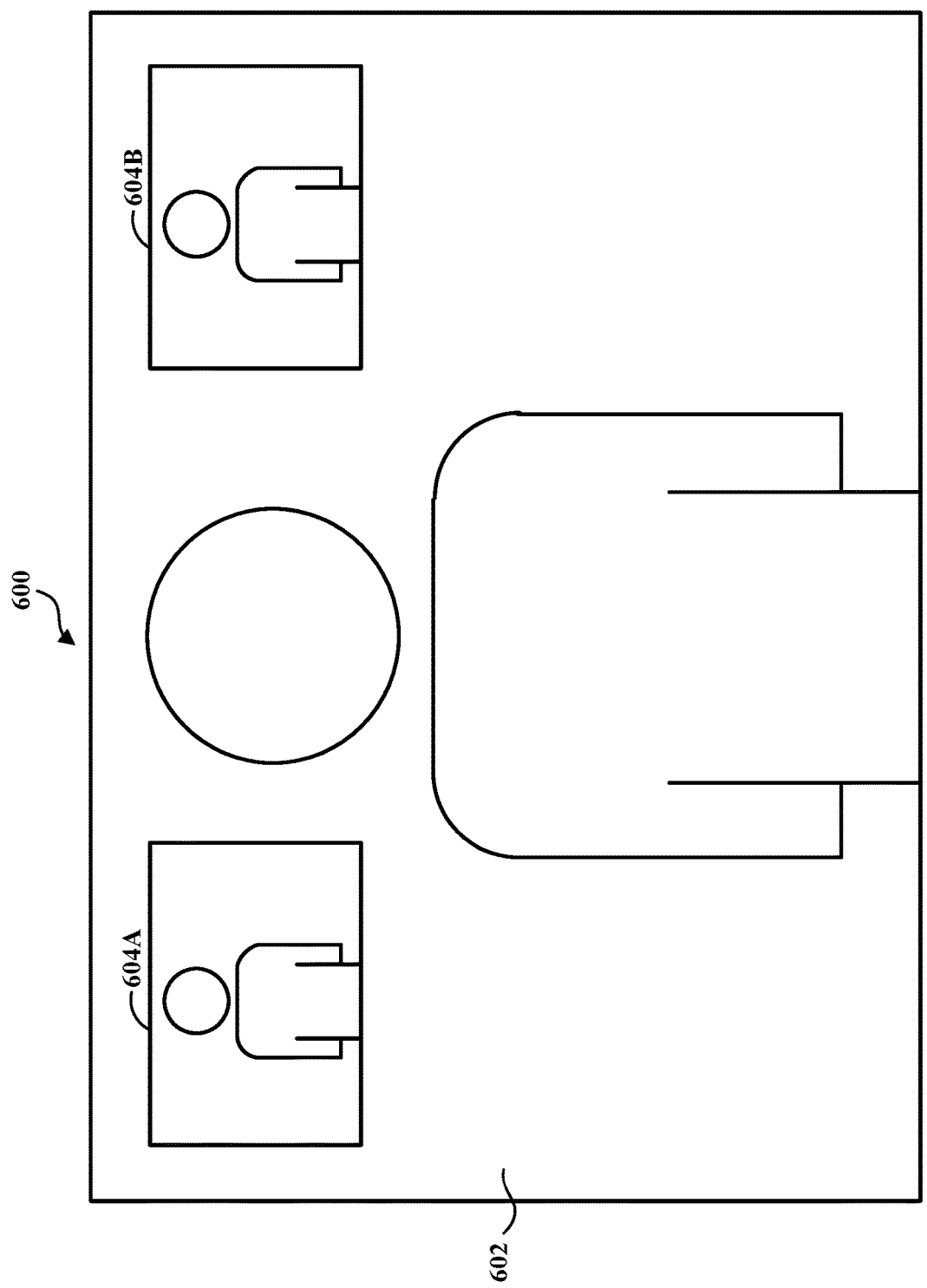
FIG. 6A is a diagram of an example of a user interface output to a display showing an automatic spotlight of participant video feeds in a video conference.

FIG. 6A is a diagram of an example of a user interface output 600 to a display showing an automatic spotlight of participant video feeds. The user interface output may be displayed on a component of a client or device, such as client 102 or phones 104 shown in FIG. 1, or clients 308, 310 and phone 312 shown in FIG. 3. In this example, the user interface output 600 includes a host video feed 602 and participant video feeds 604A and 604B. In this example, the automatic spotlight queue may be hidden to provide a less cluttered viewing option. As shown in FIG. 6A, the participant video feeds 604A and 604B are in an active spotlight status and shown in picture-in-picture views that are overlaid on a display area of the host video feed 602. The participant video feeds 604A and 604B may be dynamically resized and positioned based on a foreground detection as described in FIG. 5. For example, the participant video feeds 604A and 604B may be dynamically resized and positioned based on the foreground detected in the display area of the host video feed 602, such that the participant video feeds 604A and 604B are positioned in an area of the display identified as the background so as not to block the view of the host.

Figure 6B:
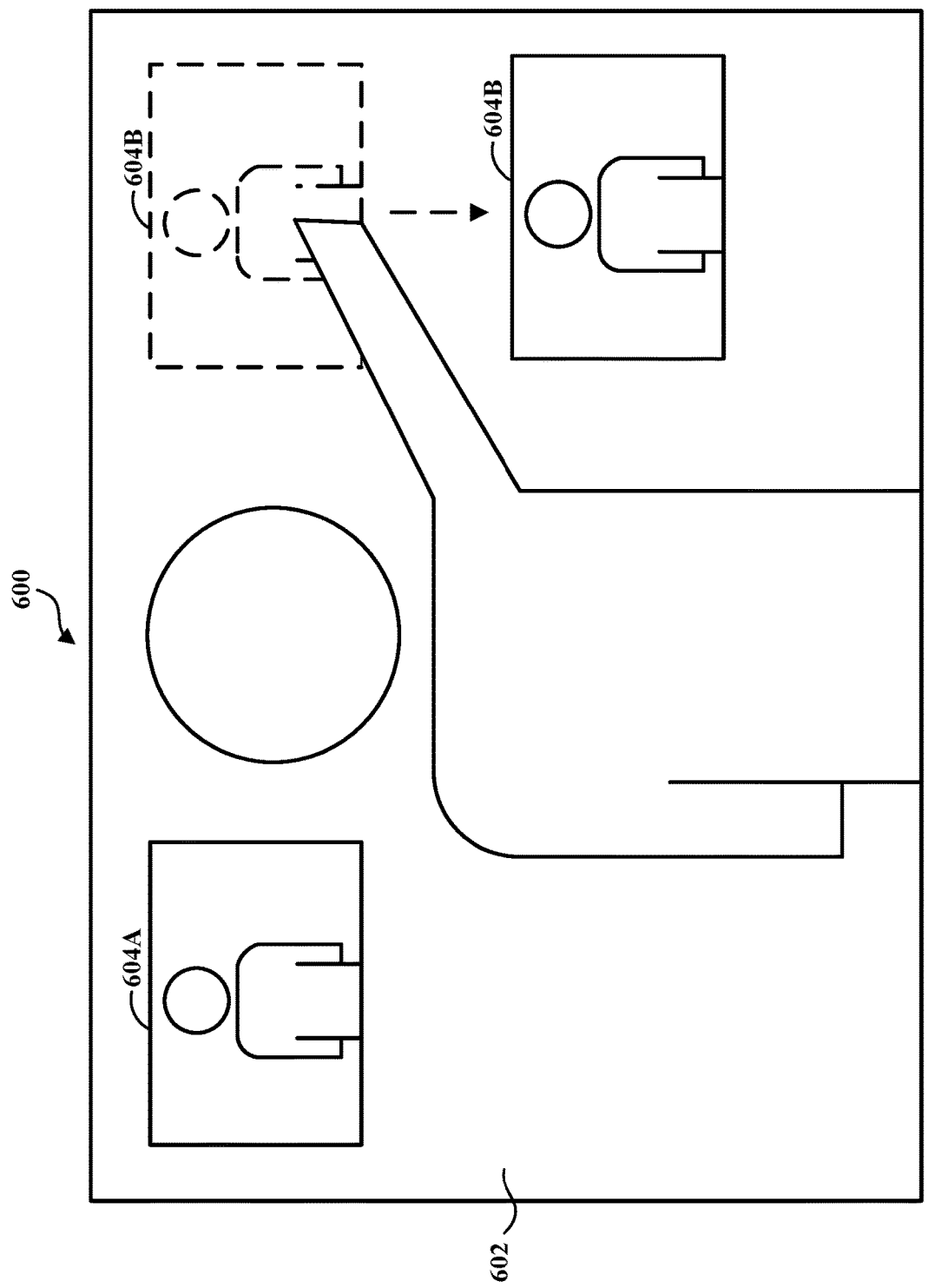
FIG. 6B is a diagram of an example of a user interface output to display showing dynamic video feed positioning of an automatic spotlight of a participant video feed in a video conference.

FIG. 6B is a diagram of an example of the user interface output 600 to a display showing dynamic video feed positioning of an automatic spotlight of a participant video feed. As shown in FIG. 6B, the host in the host video feed 602 has extended his arm such that it would be partially blocked from view by the participant video feed 604B that is in an active spotlight status. In this example, when the host extends his arm, the detected foreground area is extended to include the extended arm. The conference system is configured to detect that the participant video feed 604B is in an area of the display that contains a foreground object, i.e., the extended arm of the host in this example. Based on the detection that the participant video feed 604B is in an area of the display that contains a foreground object, the conference system is configured to automatically reposition the participant video feed 604B to a background area of the display that does not include the foreground object.

In this example, participant video feed 604A and participant video feed 604B are tracked using bounding boxes such that the conference system is spatially aware of the participant video feeds that are in active spotlight status. The conference system may detect that the bounding box of an object in the host video feed 602 overlaps with a spatial location of the bounding box of a participant video feed in an active spotlight status, such as participant video feed 604B, for example, based on a movement of the object in the host video feed 602. Based on a detection that an object of the host video feed 602 is overlapping a spatial location of the participant video feed 604B, the conference system determines a new placement of the participant video feed 604B such that the bounding box of the object in the host video 602 no longer overlaps with a spatial location of the bounding box of the participant video feed 604B. Repositioning of the participant video feed 604B may be based on a time threshold to prevent frequent and disruptive flashing. For example, the participant video feed 604B may be repositioned when a duration of time exceeds the time threshold. Alternatively, repositioning of the participant video 604B may be based on a threshold number of times that the object of the host video feed overlaps with the participant video feed 604B.

Figure 7:
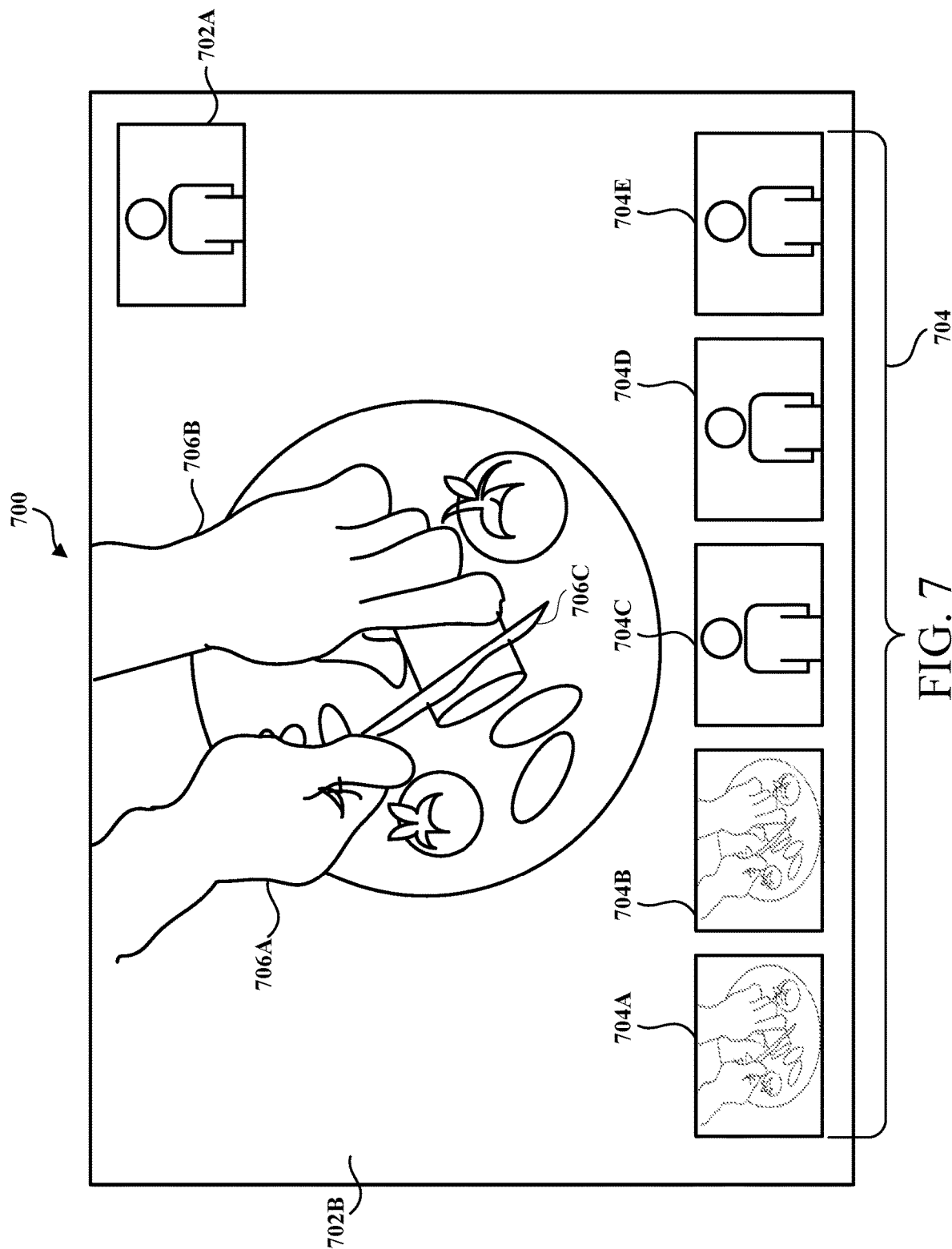
FIG. 7 is a diagram of an example of a user interface output to a display showing a show-and-tell mode in a video conference.

FIG. 7 is a diagram of an example of a user interface output 700 to a display showing a show-and-tell mode. The show-and-tell mode reduces the size of a host primary video to a picture-in-picture view and elevates another host camera view to a primary area of the display. The user interface output 700 may be displayed on a component of a client or device, such as client 102 or phones 104 shown in FIG. 1, or clients 308, 310 and phone 312 shown in FIG. 3. In this example, the host may have a multiple camera setup. For example, a primary camera may be directed towards the host to provide a front view, and one or more secondary cameras, for example an overhead camera directed at a cutting board surface, may be directed down to provide an overhead view. Other secondary cameras, to the extent any are used, may be used to provide side views, zoom views, or any other view. The user interface output 700 includes a primary host video feed 702A, a secondary host video feed 702B, and an automatic spotlight queue 704. In this example, the host may select a show-and-tell mode via a touch input on a user interface of a host device. A conference system, such as the conference system 300 shown in FIG. 3, may reduce the size of the primary host video feed 702A to a picture-in-picture display over the secondary host video feed 702B, as shown in FIG. 7. In this example, the secondary host video feed 702B may be used as a reference video feed to determine a relevance score. The relevance score may be an indication of how relevant the activity is to conference participants.

The automatic spotlight queue 704 includes participant video feeds 704A-704E. One or more of the participants may have a multiple camera setup. For example, a primary camera may be directed towards the participant to provide a front view, and one or more secondary cameras, for example an overhead camera directed at a cutting board surface to provide an overhead view. Other secondary cameras, to the extent any are used, may be used to provide side views, zoom views, or any other view. In this example, the participants of video feeds 704A and 704B may have multiple camera setups, and the video feeds of the respective secondary cameras are shown. Although the automatic spotlight queue 704 is shown at the bottom of the display, the automatic spotlight queue 704 may be at the top of the display, the left or right side of the display, or any combination thereof.

In this example, the conference system is configured to monitor the secondary host video feed 702B based on the selection of the show-and-tell mode. The conference system may detect one or more objects in the display area of the secondary host video feed 702B, for example, hands 706A and 706B, and a knife 706C. The participant video feeds 704A-704E may be automatically added to the automatic spotlight queue 704 based on motion detection, object detection, or both. Once in the automatic spotlight queue 704, the display areas of the participant video feeds 704A-704E are monitored for activity, such as one or more gestures, facial expressions, movements, or the like, detected in the secondary host video feed 702B, or specific objects based on one or more detected objects in the host video feed 702, such as one or more of hands 706A and 706B, or knife 706C.

The conference system may determine a relevance score for each of the participant video feeds 704A-704E, for example, based on a correlation of an activity of a participant or movement of an object in a participant video feed to an activity of the host or movement of an object in the secondary host video feed 702B. In this example, participant video feeds 704A and 704B may be compared to the secondary host video feed 702B to determine whether there is a probabilistic match between activities or movements in the secondary host video feed 702B and the respective participant video feeds 704A and 704B. The conference system may use probabilistic matching to determine a statistical probability that an object or activity detected in one video feed represents the same object or activity detected in another video feed. If there is a probabilistic match, the relevance score may be determined based on the probabilistic match. For example, a higher statistical probability that the objects or activities in the video feeds match would indicate a higher relevance score. The probabilistic match may be based on a spatial matching that uses a color map. The color map may be used to map pixel data by color to compare pixel data between video feeds. The colors of each pixel may represent a spatial position of the pixel. The participant video feeds 704A-704E may be displayed based on a relevance score. In the example shown in FIG. 7, the participant video feeds 704A-704E may be displayed from highest relevance score to lowest relevance score, where participant video feed 704A has the highest relevance score and participant video feed 704E has the lowest relevance score. The automatic spotlight queue 704 may include any number of participant video feeds. Although FIG. 7 shows a single row of participant video feeds, some implementations may include multiple rows of participant video feeds, and each row may include any number of participant video feeds.

Participants may have an option to toggle between gallery mode or show-and tell mode. In some examples, the conference system may allow participants to interact with the automatic spotlight queue 704 and the secondary host video feed 702B by dragging-and-dropping a participant video feed from the automatic spotlight queue 704 to the secondary host video feed 702B such that the participant video feed replaces the secondary host video feed 702B as the main video feed. In this example, the participant video feed will become the largest video feed on the display, temporarily displacing the secondary host video feed 702B until either show-and-tell mode ends or the participant drags another participant video feed to the main video feed.

Figure 8:
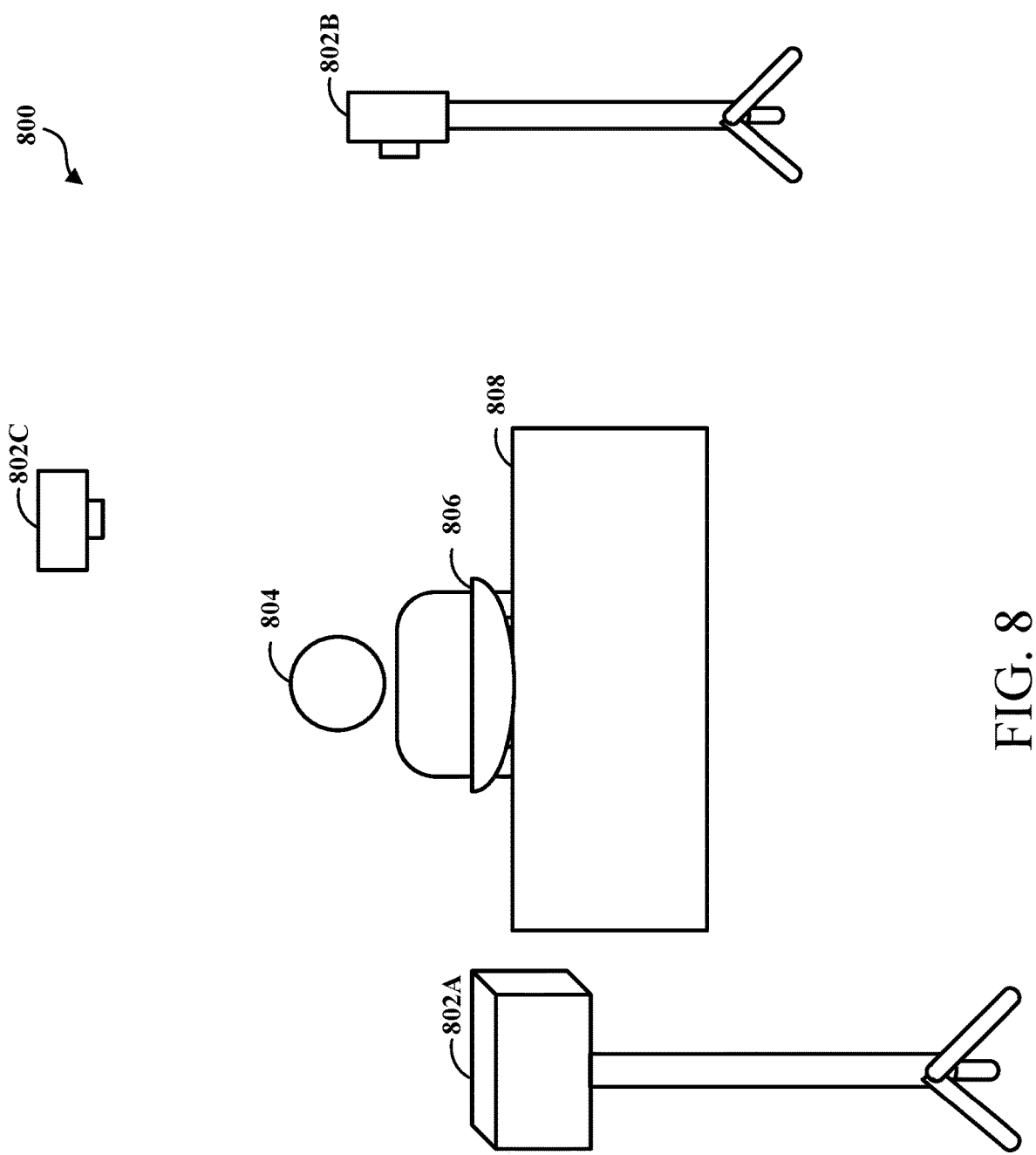
FIG. 8 is a diagram of an example of a multi-camera setup for a video conference.

FIG. 8 is a diagram of an example of a multi-camera setup 800 for a video conference. The multi-camera setup 800 includes two or more cameras, for example, a first camera 802A, a second camera 802B, and a third camera 802C. The first camera 802A, second camera 802B, and third camera 802C are connected to a client (not shown), such as client 102 shown in FIG. 1 or clients 308 and 310 shown in FIG.

3. In some examples, one or more of the cameras 802A-802C may be clients that are configured to communicate with a conference system, such as conference system 300 shown in FIG. 3. The cameras 802A-802C are configured to transmit respective video feeds to the client wirelessly or via a wire. In some examples, one or more of cameras 802A-802C may have partially overlapping fields-of-view (FOVs). In other examples, the cameras 802A-802C may have non-overlapping FOVs.

In this example, the first camera 802A is directed at a host 804. The first camera 802A may be configured to capture a wide-angle front view of a recording area. The wide-angle front view may include the host, a first object 806, a second object 808, or any combination thereof. In this example, the video conference may be for a cooking show where the first object 806 may be a mixing bowl, and the second object 808 may be a cooking surface. In some examples, the first camera 802A may be configured to capture a zoom view, for example, to frame a display area of a display with the host 804, the face of the host 804, the first object 806, or the second object 808.

The first camera 802A is configured to transmit a camera feed to the conference system. In some examples, the first camera 802A may be configured to perform face detection, motion detection, gesture detection, object detection, or any combination thereof. The zoom view of the first camera 802A may be based on face detection, motion detection, gesture detection, object detection, audio detection, or any combination thereof. For example, if the first camera 802A detects motion in an area of first object 806, the first camera 802A may automatically adjust the zoom to frame the display area of a display with the first object 806.

The second camera 802B is directed at the first object 806 in this example. In some examples, the second camera 802B may be directed at the host 804 or the second object 808. The second camera 802B is configured to capture a side view of the recording area. The second camera 802B may be configured to capture a zoom view, similar to the first camera 802A.

The second camera 802B is configured to transmit a camera feed to the conference system. In some examples, the second camera 802B may be configured to perform face detection, motion detection, gesture detection, object detection, or any combination thereof. Similar to the first camera 802A, the zoom view of the second camera 802B may be based on face detection, motion detection, gesture detection, object detection, audio detection, or any combination thereof. For example, if the second camera 802B detects motion in an area of second object 808, the second camera 802B may automatically adjust the zoom to frame the display area of a display with the second object 808.

The third camera 802C is directed at the second object 808 in this example. In some examples, the third camera 802C may be directed at the first object 806. The third camera 802C is configured to capture an overhead view of the recording area. The third camera 802B may be configured to capture a zoom view, similar to the first camera 802A.

The third camera 802C is configured to transmit a camera feed to the conference system. In some examples, the third camera 802C may be configured to perform face detection, motion detection, gesture detection, object detection, audio detection, or any combination thereof. Similar to the first camera 802A, the zoom view of the third camera 802C may be based on face detection, motion detection, gesture detection, object detection, or any combination thereof. For example, if the third camera 802C detects motion in an area of second object 808, the second camera 802B may automatically adjust the zoom to frame the display area of a display with the second object 808.

The conference system is configured to obtain the respective video feeds from cameras 802A-802C, for example, via the client. The conference system is configured to perform face detection, motion detection, gesture detection, audio detection, and object detection on the obtained video feeds. The conference system is configured to select a respective video feed to display on an area of a display, such as a primary area, a secondary area, or both. The selection of the video feeds may be based on one or more of the face detection, motion detection, gesture detection, or object detection. The conference system is configured to switch the video feeds from the primary area to the secondary area, and vice-versa, for example, based on one or more of the face detection, motion detection, gesture detection, or object detection.

Figure 9:
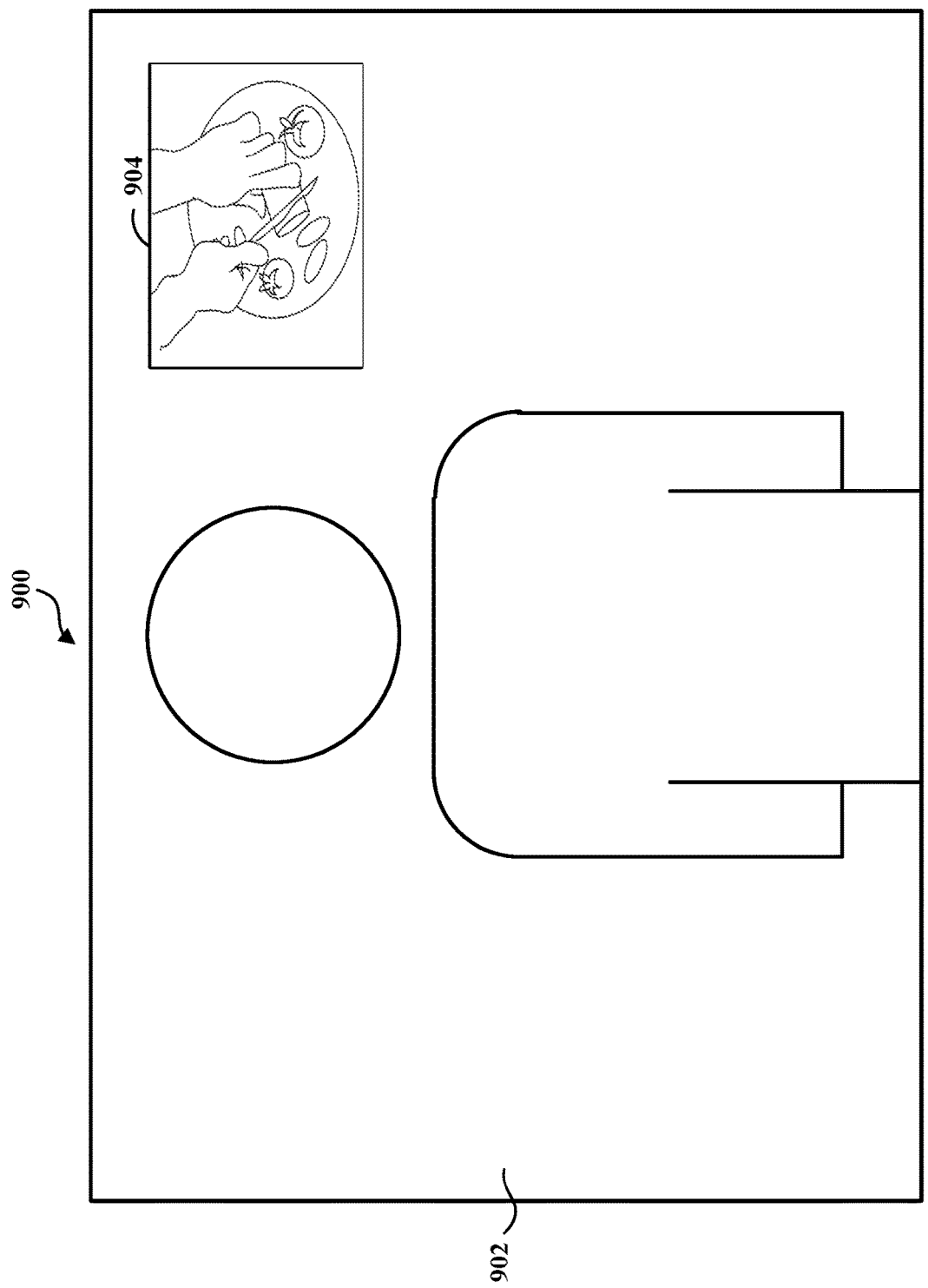
FIG. 9 is a diagram of an example of a user interface output to a display of multi-camera host video feeds in a video conference.

FIG. 9 is a diagram of an example of a user interface output 900 to a display of multi-camera host video feeds in a video conference. The user interface output 900 includes a primary area 902 and a secondary area 904. A video feed from any one of cameras 802A-802C shown in FIG. 8 may be displayed in primary area 902, for example the video feed camera 802A is shown. A video feed from any one of cameras 802A-802C shown in FIG. 8 may be displayed in the secondary area 904, for example the video feed from camera 802C is shown. Selection of the video feed to display in the primary area 902 or the secondary area 904 may be based on a relevance score. The relevance score may be an indication of how relevant the activity is to conference participants.

In the example shown in FIG. 9, one secondary area is shown, however, the number of secondary areas may vary depending on the number of cameras that are in use at the host location. The secondary area 904 may be positioned anywhere on the display such that it does not obstruct the view of the host or a detected object in the foreground of the primary area 902. The secondary area may be dynamically positioned and sized based on a determined area of background as discussed in FIGS. 5 and 6A.

Figure 10:
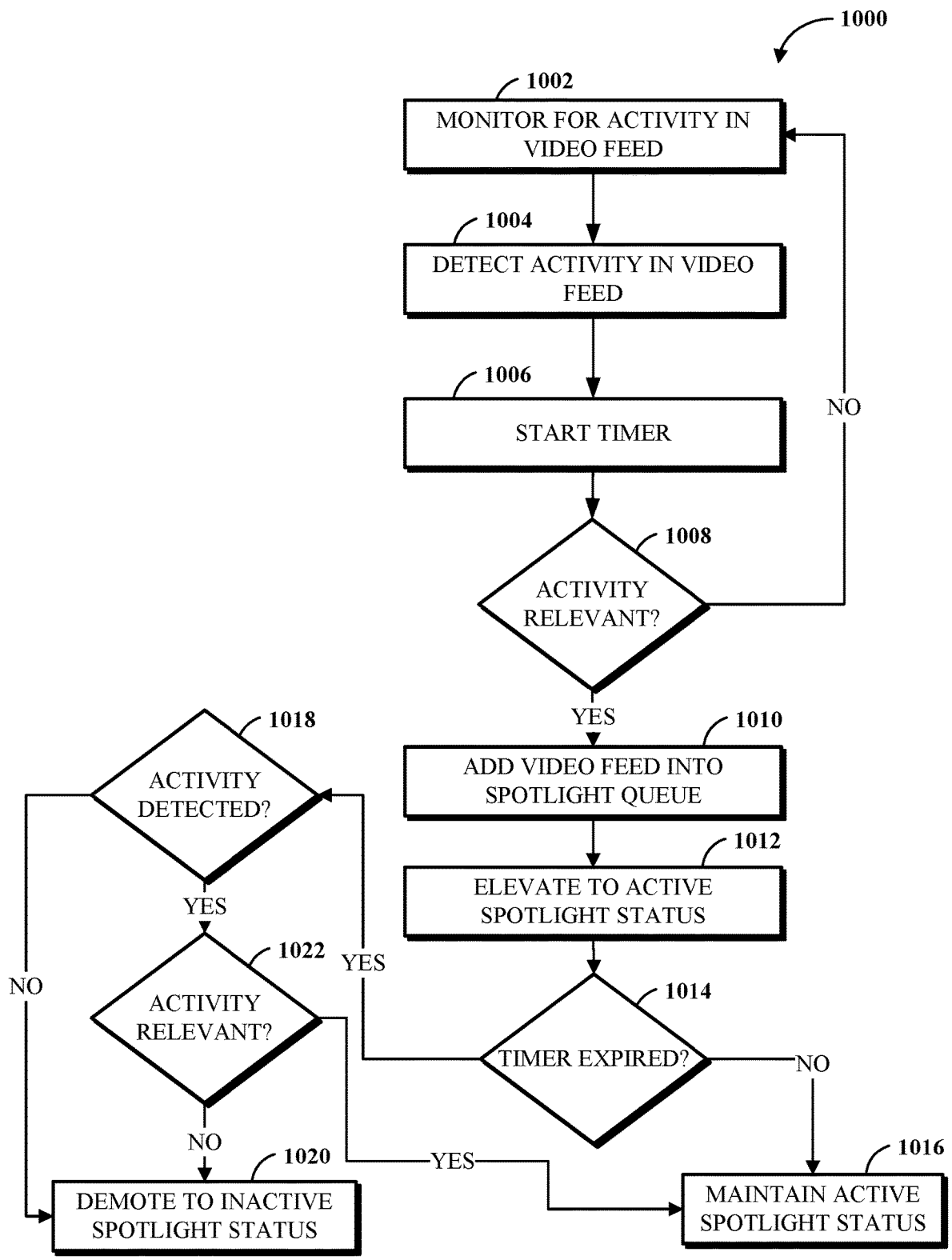
FIG. 10 is a flowchart of an example of a method for performing an automatic spotlight of a participant video feed in a video conference.

To further describe some implementations in greater detail, reference is next made to examples of techniques which may be performed by or using a conference system to perform an automatic spotlight of a participant video feed. FIG. 10 is a flowchart of an example of a method 1000 for performing an automatic spotlight of a participant video feed. The method 1000 can be executed using computing devices, such as the systems, hardware, and software described with respect to FIGS. 1-9. The method 1000 can be performed, for example, by executing a machine-readable program or other computer-executable instructions, such as routines, instructions, programs, or other code. The steps, or operations, of the method 1000 or another technique, method, process, or algorithm described in connection with the implementations disclosed herein can be implemented directly in hardware, firmware, software executed by hardware, circuitry, or a combination thereof.

For simplicity of explanation, the method 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement method 1000 in accordance with the disclosed subject matter.

At 1002, the method 1000 includes monitoring for activity in a display area of a video feed. The video feed may be a video feed of a participant in a video conference. Activity may be monitored in one or more areas of the video feed or the entire display area of the video feed. In some examples, an area determined to be a background area may not be monitored for activity. Monitoring for activity may include periodically sampling the display area of the video feed to detect an activity. For example, the display area of the video feed may be sampled every 10 seconds. The duration of the sampling may be fixed or variable. The periodicity and duration of the sampling may be based on the activity. For example, the sampling periodicity and duration for an activity that has a high level of movement, such as an exercise class, may be lower than the sampling periodicity and duration for an activity that has a low level of movement, such as a webinar. The low level movement activities may require a higher sampling periodicity and duration in order to avoid missing an activity. The type of activity may be determined based on a rate at which changes in motion are detected, based on an analysis of detected movements using an activity AI algorithm, or based on a host setting.

At 1004, the method 1000 includes detecting activity in the display area of the video feed. Detection of the activity may include motion detection, facial detection, gesture detection, object detection, or any combination thereof. In some examples, the detected activity may be audio corresponding to the video feed. Detection of the activity may be based on a threshold. For example, motion detection may be associated with a low threshold to be considered a valid activity. A valid activity is an activity that is determined to be relevant to the content of the video conference. For example, known activities that are not relevant to the content of the video conference may be stored at the conference system to compare against detected activities. For example, a person shifting in a chair may be an activity that is stored as an activity that is not relevant. If a detected activity matches a stored activity that is not relevant, the detected activity will be deemed not relevant. If the detected activity does not match a stored activity that is not relevant, the detected activity will be deemed valid. Gesture detection may be associated with a medium to high threshold to be considered a valid activity. Object detection may be associated with a medium to high threshold to be considered a valid activity.

In some examples, the method 1000 includes starting 1006 a timer. The timer may be started based on the detection of an activity that satisfies the threshold in the display area of the video feed. The duration of the timer may be fixed or variable. The duration of the time may be based on the activity. For example, the duration of the timer for an activity that has a high level of movement, such as an exercise class, may be lower than the duration of the timer for an activity that has a low level of movement, such as a webinar. The low level movement activities may require a longer timer duration to avoid a false positive identification of an idle period in a low level movement activity. In some cases, the use of a timer may be omitted in method 1000.

At 1008, the method 1000 includes determining whether the detected activity is relevant to the content of the video conference. Determining whether the detected activity is relevant may include determining a relevance score for the video feed, for example, based on a correlation of an activity of a participant or movement of an object in the video feed to an activity of the host or a movement of an object in a host video feed. In this example, the video feed may be compared to the host video feed to determine whether there is a probabilistic match between activities or movements in the host video feed and the video feed. If there is a probabilistic match, the relevance score of the activity may be determined based on the probabilistic match. The probabilistic match may be based on a spatial matching that uses a color map. The color map may be used to map pixel data by color to compare pixel data between video feeds. The colors of each pixel may represent a spatial position of the pixel. If it is determined that the activity is not relevant, the method 1000 will continue monitoring 1002 for activity in the video feed.

If it is determined that the activity is relevant, the method 1000 includes adding 1010 the video feed into a spotlight queue, such as the automatic spotlight queue 404 shown in FIGS. 4A-4C or the automatic spotlight queue 704 shown in FIG. 7. Video feeds may be displayed in the spotlight queue based on their relevance score. For example, the video feeds may be shown in order of ranking from the highest relevance score to the lowest relevance score. In another example, the video feeds may be shown for all video feeds that meet a threshold relevance score without ranking. The relevance score of the video feed may be compared to a relevance score of a video feed that is in an active spotlight status.

At 1012, the video feed is elevated to an active spotlight status. Elevating the video feed to an active spotlight status includes removing the video feed from the spotlight queue and elevating the video feed to automatically display the video feed in an area of the display adjacent to the host video feed. When the video feed is elevated to the active spotlight status, the conference system is configured to automatically resize the video feed and the host video feed. In some examples, the conference system may be configured to automatically unmute the audio component of the video feed when elevating the video feed to the active spotlight status. In an example, the video feed that has the highest relevance score may be automatically spotlighted and elevated to an active spotlight status. For example, if the relevance score of the video feed is higher than a relevance score of another video feed in the active spotlight status, the video feed may be elevated to the active spotlight status to replace the other video feed that may be demoted to the spotlight queue. In another example, elevation of a video feed to an active spotlight status may be based on a threshold, for example, the video feed may be elevated to the active spotlight status when the relevance score meets a threshold value.

In some examples, the timer may be started when the participant video feed is displayed adjacent to the host video feed. At 1014, the method 1000 includes determining whether the timer has expired. If the timer has not expired, the conference system is configured to maintain 1016 the active spotlight status for the video feed.

If it is determined that the timer has expired, the method 1000 includes determining 1018 whether activity is detected in the display area of the participant video feed. Detection of the activity may include motion detection, facial detection, gesture detection, object detection, or any combination thereof. Detection of the activity may be based on a threshold. For example, motion detection may be associated with a low threshold to be considered a valid activity. Gesture detection may be associated with a medium to high threshold to be considered a valid activity. Object detection may be associated with a medium to high threshold to be considered a valid activity.

If it is determined that activity is not detected at 1018, the method 1000 includes demoting 1020 the video feed to an inactive spotlight status. Demoting 1020 the video feed to an inactive spotlight status includes removing the video feed from the display area adjacent to the host video feed and adding the video feed to the spotlight queue. When the video feed is demoted to the inactive spotlight status, the conference system is configured to automatically resize the video feed and the host video feed. For example, the conference system is configured to reduce the size of the video feed as it is entered into the spotlight queue, and increase the size of the host video feed to accommodate the primary display area of the display. In some examples, a next video feed may be automatically elevated to the active spotlight status when the video feed is demoted to the inactive spotlight status. Video feeds in the inactive spotlight status may be displayed in a general gallery of the video conference or the spotlight queue.

If it is determined that activity is detected at 1018, the method 1000 includes determining 1022 whether the detected activity is relevant. In some examples, the activity detected at 1018 may be different than the activity detected at 1004. Determining whether the detected activity is relevant may include determining a relevance score for the video feed, for example, based on a correlation of an activity of a participant or a movement of an object in the video feed to an activity of the host or a movement of an object in a host video feed. In this example, the video feed may be compared to the host video feed to determine whether there is a probabilistic match between activities or movements in the host video feed and the video feed. If there is a probabilistic match, the relevance score may be determined based on the probabilistic match. If it is determined that the activity is not relevant, the method 1000 will demote 1020 the video feed to the inactive status. If it is determined that the activity is relevant, the conference system is configured to maintain 1016 the active spotlight status for the video feed. In some examples, the timer may be restarted if the relevance score is determined to be above a threshold.

In some implementations, multiple participant video feeds may be elevated to an active spotlight status concurrently. For example, if two or more participant feeds are determined to have relevance scores above a threshold, the two or more participant feeds may be elevated to the active spotlight status and displayed adjacent to the host video feed.

Figure 11:
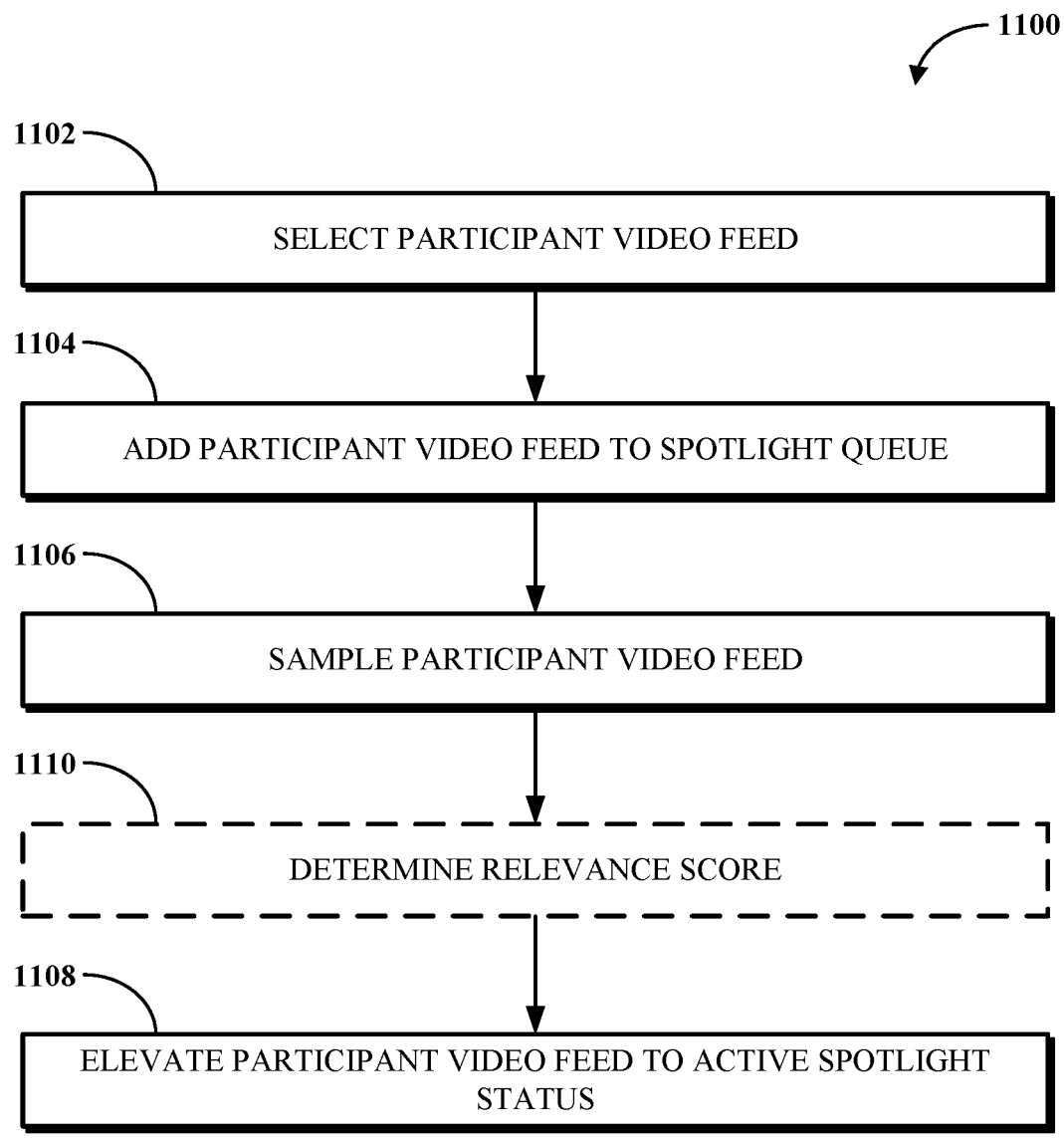
FIG. 11 is a flowchart of an example of another method for performing an automatic spotlight of a participant video feed in a video conference.

FIG. 11 is a flowchart of an example of another method 1100 for performing an automatic spotlight of a participant video feed. The method 1100 can be executed using computing devices, such as the systems, hardware, and software described with respect to FIGS. 1-9. The method 1100 can be performed, for example, by executing a machine-readable program or other computer-executable instructions, such as routines, instructions, programs, or other code. The steps, or operations, of the method 1100 or another technique, method, process, or algorithm described in connection with the implementations disclosed herein can be implemented directly in hardware, firmware, software executed by hardware, circuitry, or a combination thereof.

For simplicity of explanation, the method 1100 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement method 1100 in accordance with the disclosed subject matter.

At 1102, the method 1100 includes selecting a participant video feed. Selecting the participant video feed may include the video conference system automatically detecting activity in a display area of the participant video feed. Detection of the activity may include motion detection, facial detection, gesture detection, object detection, or any combination thereof. In some examples, the detected activity may be audio corresponding to the participant video feed. Detection of the activity may be based on a threshold. The threshold may be based on a pixel motion. For example, motion detection may be associated with a low threshold to be considered a valid activity. Gesture detection may be associated with a medium to high threshold to be considered a valid activity. Object detection may be associated with a medium to high threshold to be considered a valid activity.

At 1104, the method 1100 includes adding the participant video feed to a spotlight queue. In some examples, the participant video feed is added to the spotlight queue based on a determination that the detected activity is a valid activity. The determination of whether the detected activity is a valid activity may be based on a duration of the activity. For example, if the duration of the detected activity meets a threshold, the detected activity may be determined to be a valid activity. The threshold may be a dynamic threshold such that it increases based on the number of participant feeds that have detected motion so as not to overload the spotlight queue with meaningless participant video feeds. Increasing the threshold may lead to conference system to add participant video feeds to the spotlight queue that have a higher probability of having meaningful content. In an example where the number of participant video feeds that have detected motion is low, the threshold may be low, for example 1-2 seconds to provide a sufficient number of participant video feeds to the spotlight queue. In an example where the number of participant video feeds is high, the threshold may be high, for example 5-10 seconds to avoid adding participant video feeds to the spotlight queue that have a low probability of having meaningful content.

At 1106, the method 1100 includes sampling the display area of the participant video feed. One or more areas of the participant video feed or the entire display area of the participant video feed may be sampled for activity. The duration of the sampling may be fixed or variable. The duration of the sampling may be based on a classification of the activity. The classification of the activity may be based on a comparison of the detected activity to a stored database of activities. For example, the detected activity may be classified as a particular gesture based on a probabilistic match when compared to stored gestures in the database of activities. Detected activities that remain unclassified may be stored and processed through machine learning algorithms for future classification. The periodicity and duration of the sampling may be based on the activity. For example, the sampling periodicity and duration for an activity that has a high level of movement, such as an exercise class, may be lower than the sampling periodicity and duration for an activity that has a low level of movement, such as a webinar. The low level movement activities may require a higher sampling periodicity and duration in order to avoid missing an activity.

At 1108, the method 1100 includes elevating the participant video feed to an active spotlight status. Elevating the participant video feed to an active spotlight status includes removing the participant video feed from the spotlight queue and elevating the participant video feed to automatically display the participant video feed in an area of the display adjacent to the host video feed. When the participant video feed is elevated to the active spotlight status, the conference system is configured to automatically resize the participant video feed and the host video feed. Elevation of the participant video feed to the active spotlight status may be based on the duration of the detected activity, the classification of the detected activity, or both.

In some examples, the method 1100 may include determining 1110 a relevance score of the participant video feed. The relevance score may be based on a correlation of an activity of a participant or object in the participant video feed to an activity of the host or object in a host video feed. In this example, the participant video feed may be compared to the host video feed to determine whether there is a probabilistic match between activities in the host video feed and the video feed. If there is a probabilistic match, the relevance score may be determined based on the probabilistic match. A higher correlation value will result in a higher relevance score. In these examples, the participant video feed that has the highest relevance score may be automatically spotlighted and elevated to an active spotlight status. Alternatively, elevation of a participant video feed to an active spotlight status may be based on a threshold, for example, the participant video feed may be elevated to the active spotlight status when the relevance score meets a threshold value. The threshold for elevation may be used in examples where multiple participants are simultaneously elevated to the active spotlight status.

Figure 12:
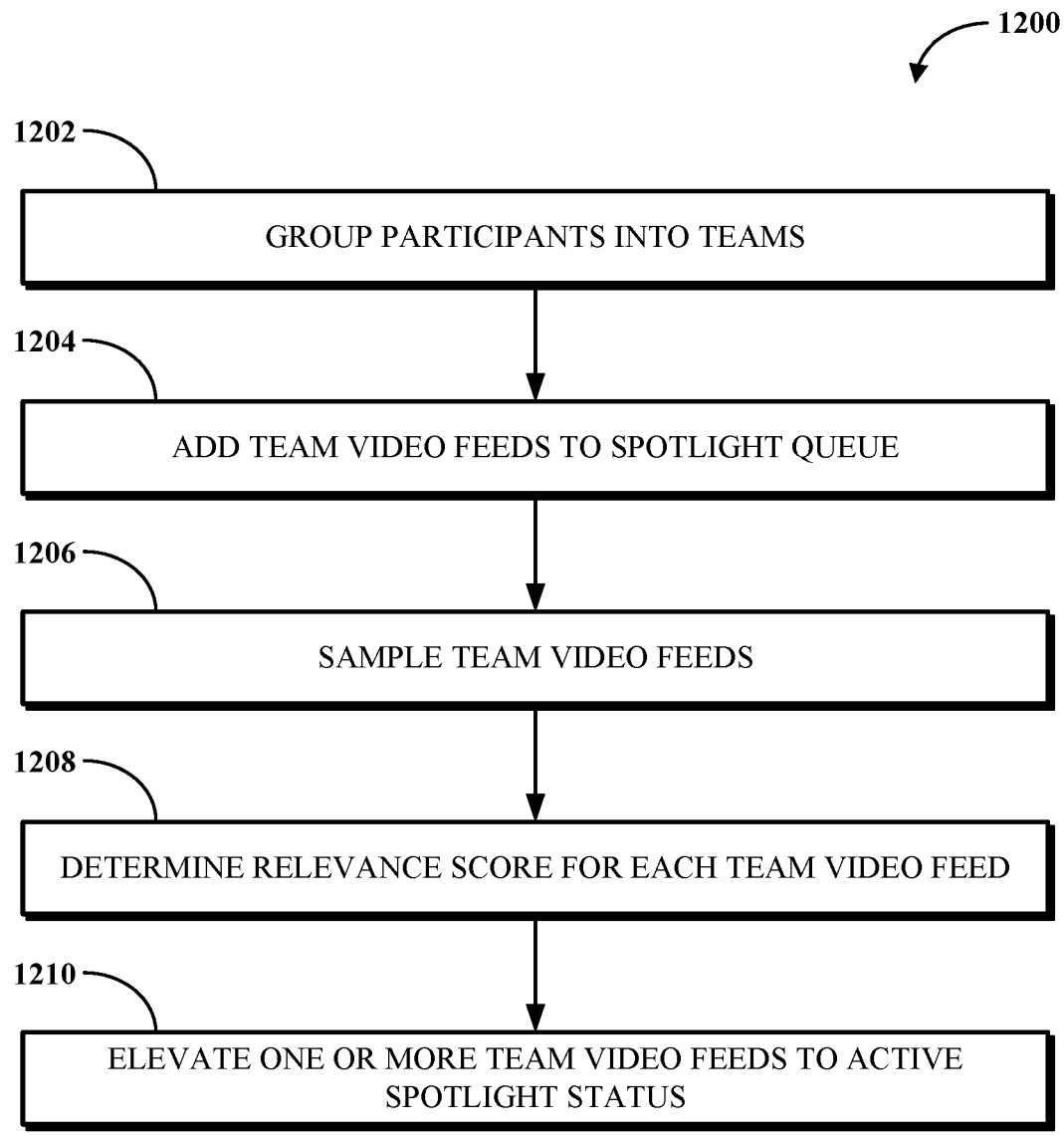
FIG. 12 is a flowchart of an example of another method for performing an automatic spotlight of a participant video feed in a video conference.

FIG. 12 is a flowchart of an example of another method 1200 for performing an automatic spotlight of a participant video feed. The method 1200 can be executed using computing devices, such as the systems, hardware, and software described with respect to FIGS. 1-9. The method 1200 can be performed, for example, by executing a machine-readable program or other computer-executable instructions, such as routines, instructions, programs, or other code. The steps, or operations, of the method 1200 or another technique, method, process, or algorithm described in connection with the implementations disclosed herein can be implemented directly in hardware, firmware, software executed by hardware, circuitry, or a combination thereof.

For simplicity of explanation, the method 1200 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement method 1200 in accordance with the disclosed subject matter.

At 1202, the method 1200 includes grouping participants into teams. Grouping the participants into teams includes grouping participant video feeds into team video feeds. The team video feeds may be displayed as pods, as shown in FIG. 4C. The participants may be grouped automatically based on a current geographic location of the participants or user account data of the participants. User account data may include data associated with a participant, for example, a name, an age, an office location, a department, an organizational position, or any other relevant data that can be used to group participants into teams. In some examples, the participants may be grouped based on a received input, for example a touch input on a user interface or other input obtained via a host conference device.

At 1204, the method 1200 includes adding the team video feeds to a spotlight queue. In some examples, the team video feeds are added to the spotlight queue based on a determination that a detected activity in one or more of the participant video feeds of the team video feed is a valid activity. The determination of whether the detected activity is a valid activity may be based on a duration of the activity. For example, if the duration of the detected activity meets a threshold, the detected activity may be determined to be a valid activity. The threshold may be a dynamic threshold such that it increases based on the number of team video feeds that have detected motion so as not to overload the spotlight queue with meaningless team video feeds. Increasing the threshold may lead to conference system to add team video feeds to the spotlight queue that have a higher probability of having meaningful content. In an example where the number of team video feeds that have detected motion is low, the threshold may be low, for example 1-2 seconds to provide a sufficient number of participant video feeds to the spotlight queue. In an example where the number of team video feeds is high, the threshold may be high, for example 5-10 seconds to avoid adding team video feeds to the spotlight queue that have a low probability of having meaningful content.

At 1206, the method 1200 includes sampling the display areas of the participant video feeds of the team video feeds. One or more areas of the participant video feeds or the entire display areas of the participant video feeds may be sampled for activity. The duration of the sampling may be fixed or variable. The duration of the sampling may be based on a classification of the activity. The classification of the activity may be based on a comparison of the detected activity to a stored database of activities. For example, the detected activity may be classified as a particular gesture based on a probabilistic match when compared to stored gestures in the database of activities. Detected activities that remain unclassified may be stored and processed through machine learning algorithms for future classification. The periodicity and duration of the sampling may be based on the activity. For example, the sampling periodicity and duration for an activity that has a high level of movement, such as an exercise class, may be lower than the sampling periodicity and duration for an activity that has a low level of movement, such as a webinar. The low level movement activities may require a higher sampling periodicity and duration in order to avoid missing an activity.

At 1208, the method 1200 includes determining a relevance score for each team video feed. The relevance score may be based on a correlation of an activity of one or more participants or objects in the respective participant video feeds of the team video feed to an activity of the host or object in a host video feed. In this example, the participant video feed may be compared to the host video feed to determine whether there is a probabilistic match between activities in the host video feed and the video feed. If there is a probabilistic match, the relevance score may be determined based on the probabilistic match. A higher correlation value will result in a higher relevance score. In some examples, a relevance score may be determined based on a correlation of activities between participants on the same team.

At 1210, the method 1200 includes elevating one or more team video feeds to an active spotlight status. Elevating a team video feed to an active spotlight status includes removing the team video feed from the spotlight queue and elevating the team video feed to an area of the display adjacent to the host video feed. When the team video feed is elevated to the active spotlight status, the conference system is configured to automatically resize the team video feed and the host video feed. Elevation of the team video feed to the active spotlight status may be based on the duration of the detected activity, the classification of the detected activity, or both. In some examples, the team video feed that has the highest relevance score may be automatically spotlighted and elevated to an active spotlight status. Alternatively, elevation of a team video feed to an active spotlight status may be based on a threshold, for example, the team video feed may be elevated to the active spotlight status when the relevance score meets a threshold value. The threshold for elevation may be used in examples where multiple teams are simultaneously elevated to the active spotlight status.

Figure 13:
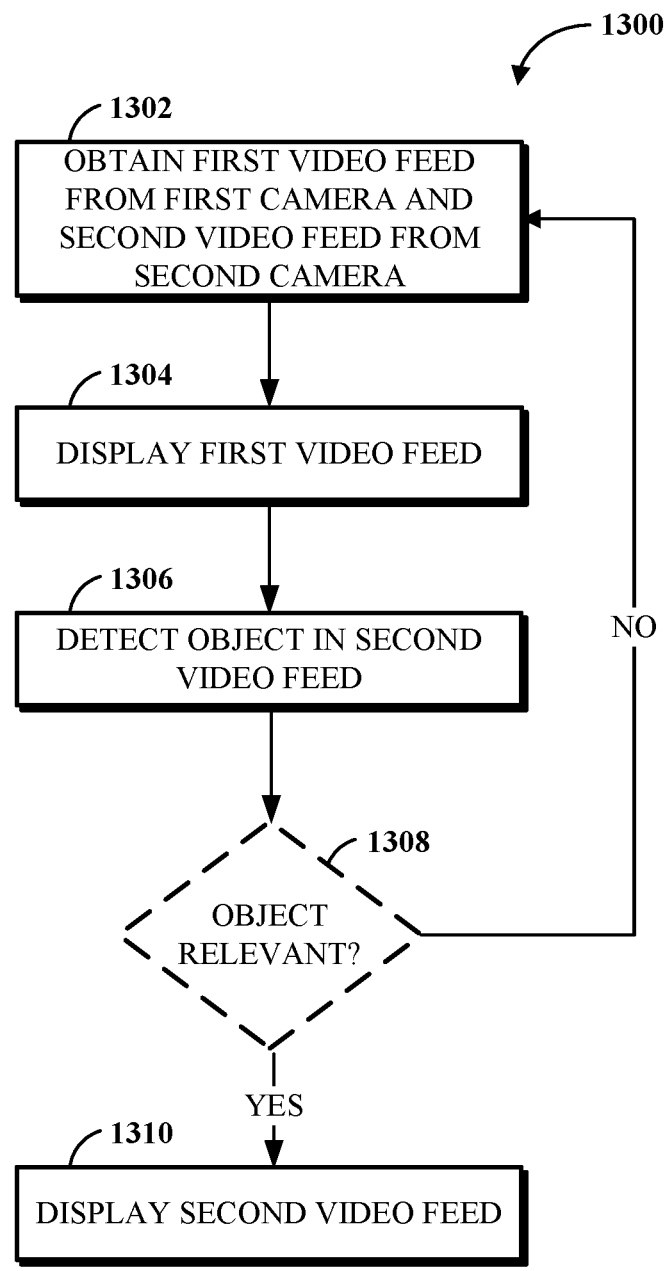
FIG. 13 is a flowchart of an example of a method for automatically switching a video feed from one camera to a video feed from another camera for display in a video conference.

FIG. 13 is a flowchart of an example of a method 1300 for automatically switching a video from one camera to a video from another camera for display in a video conference. The method 1300 can be executed using computing devices, such as the systems, hardware, and software described with respect to FIGS. 1-9. The method 1300 can be performed, for example, by executing a machine-readable program or other computer-executable instructions, such as routines, instructions, programs, or other code. The steps, or operations, of the method 1300 or another technique, method, process, or algorithm described in connection with the implementations disclosed herein can be implemented directly in hardware, firmware, software executed by hardware, circuitry, or a combination thereof.

For simplicity of explanation, the method 1300 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement method 1300 in accordance with the disclosed subject matter.

At 1302, the method 1300 includes obtaining a first video feed from a first camera, such as camera 802A shown in FIG. 8, for example, and obtaining a second video feed from a second camera, such as camera 802B shown in FIG. 8, for example. In this example, the first camera and the second camera share a location, such as a recording area of a host. The video feeds from the first camera and the second camera may be obtained by a video conference system, such as video conference system 300 shown in FIG. 3. The video feeds from the first camera and the second camera may be obtained by the video conference system via a client, such as client 102 shown in FIG. 1 or clients 308 and 310 shown in FIG. 3. The first video feed from the first camera may have a first FOV and the second video from the second camera may have a second FOV. In some examples, the first FOV may partially overlap with the second FOV. In other examples, the first FOV and the second FOV may be non-overlapping FOVs.

At 1304, the method 1300 includes displaying the first video feed. The first video feed may be displayed in a primary area of a display, such as the primary area 902 shown in FIG. 9. At 1306, the method 1300 includes detecting an object or activity in the first video feed, the second video feed, or both. The object may be a person, a face, or another object, such as a knife in a cooking show example. Detecting an object may include identifying an area of the first video feed that may contain an object. The area of the first video feed may be identified using an AI algorithm trained for object detection. In some examples, the area may be identified based on a grouping of pixels, for example a grouping of differently colored pixels. A bounding box may be drawn around the identified area. The identified area may be classified as a particular object based on a probabilistic match when compared to stored objects in a database of objects. Detected objects that remain unclassified may be stored and processed through machine learning algorithms for future classification. In some examples, the identified area may include surrounding area of the detected object. The identified area may be sampled for objects using a machine learning (ML) object detection model. In some examples, the ML object detection model may identify the area to be sampled.

In some examples, at 1308, the method 1300 includes determining whether the detected object is relevant. Determining whether the detected object or activity is relevant may include determining a relevance score for the object or activity. The relevance score may be based on a correlation of facial detection and an audio component of a corresponding video feed. For example, the facial detection may be used to determine that a mouth is moving and correlate the movement of the mouth with the audio component of the corresponding video feed to determine that a speaker is speaking to adjust the relevance score of the corresponding video feed. The relevance score may be based on a gaze detection of a video conference host. For example, the video conference system may determine that the video conference host is looking at a particular camera for a minimum time duration and may adjust the relevance score of the corresponding video feed. The relevance score may be based on a correlation of the object or activity to a set of one or more objects or activities stored in a database that are associated with an activity, a determination of the object type relative to the activity, a duration or time that the object is in motion, a duration of time that the activity persists, or any combination thereof. In a cooking show example, the set of one or more objects stored in a database include, and are not limited to, a knife, a spoon, a fork, a mixing bowl, a frying pan, a cutting board, or any other object that may be relevant to a cooking show. In a woodworking show example, the one or more objects stored in the database include, and are not limited to, a hammer, a nail, a screw, a screwdriver, a chisel, a block of wood, or any other object that may be relevant to a woodworking show. The detected object may be compared to the set of one or more objects to determine whether there is a probabilistic match between the detected object and the set of one or more objects. If there is a probabilistic match, the relevance score may be determined based on a correlation value of the probabilistic match. A higher correlation value will result in a higher relevance score. The probabilistic match may be based on a spatial matching that uses a color map.

The relevance score may be based on a participant engagement score. The participant engagement score may be determined using gaze tracking of participant video feeds. The gaze tracking can be used to determine which areas of the display participants are viewing. For example, the gaze tracking may be used to determine whether the participants are viewing the primary area of the display or the secondary area of the display. The participant engagement score may be based on a number of participants viewing a particular area of the display. For example, if a threshold number of participants are viewing a secondary area of the display, the system may automatically switch the primary area of the display to display another video feed to increase participant engagement. In some examples, facial detection of participant video feeds may be used to determine the participant engagement score.

At 1310, the method 1300 includes displaying the second video feed. The second video feed may be automatically displayed in the primary area of the display based on the detection of the object or activity. In some examples, the second video feed may be displayed in the primary area of the display based on the detection of a gesture in the second video feed. In some examples, the second video feed may be displayed in the primary area of the display based on a detection of a face in the second video feed, or an absence of the detection of a face in the first video feed, for example, when the host looks away from the camera such that the face of the host is no longer detected. In some examples, the second video feed may be displayed in the primary area of the display when the relevance score of the second video feed is determined to be greater than the relevance score of the first video feed. In some examples, the video conference system may be configured to automatically adjust the zoom on a video feed when the video feed is displayed in the primary area of the display.

In some examples, the first video feed from the first camera may be minimized to the secondary area of the display when the second video feed from the second camera is displayed in the primary area of the display. In some examples, the first video from the first camera may be terminated in the primary area of the display when the second video feed from the second camera is displayed in the primary area of the display.

In some implementations, the video conference system may determine a conference type associated with a video conference that includes the first video feed and the second video feed. The conference type may be based on a predetermined setting. For example, a predetermined setting for a cooking class may be to display the video feed of preparing ingredients when significant motion is detected in the first video feed and display the second video feed when significant motion is not detected in the first video feed. In an example of a funeral, the predetermined setting may be to display the video feed of a speaker and occasionally switch the video feed to a video feed of the audience or a video feed of the casket. The video conference system may detect an activity or an object associated with the conference type in the first video feed, the second video feed, or both, and adjust the respective relevance scores to account for the detected activity, object, or conference type. In some implementations, the relevance score may be adjusted based on the detection of one or more discussion points of a conference plan (e.g., conference agenda). For example, the video conference system may detect that a particular discussion point of the conference plan is being discussed using voice detection and adjust the relevance score based on that detection.

Figure 14:
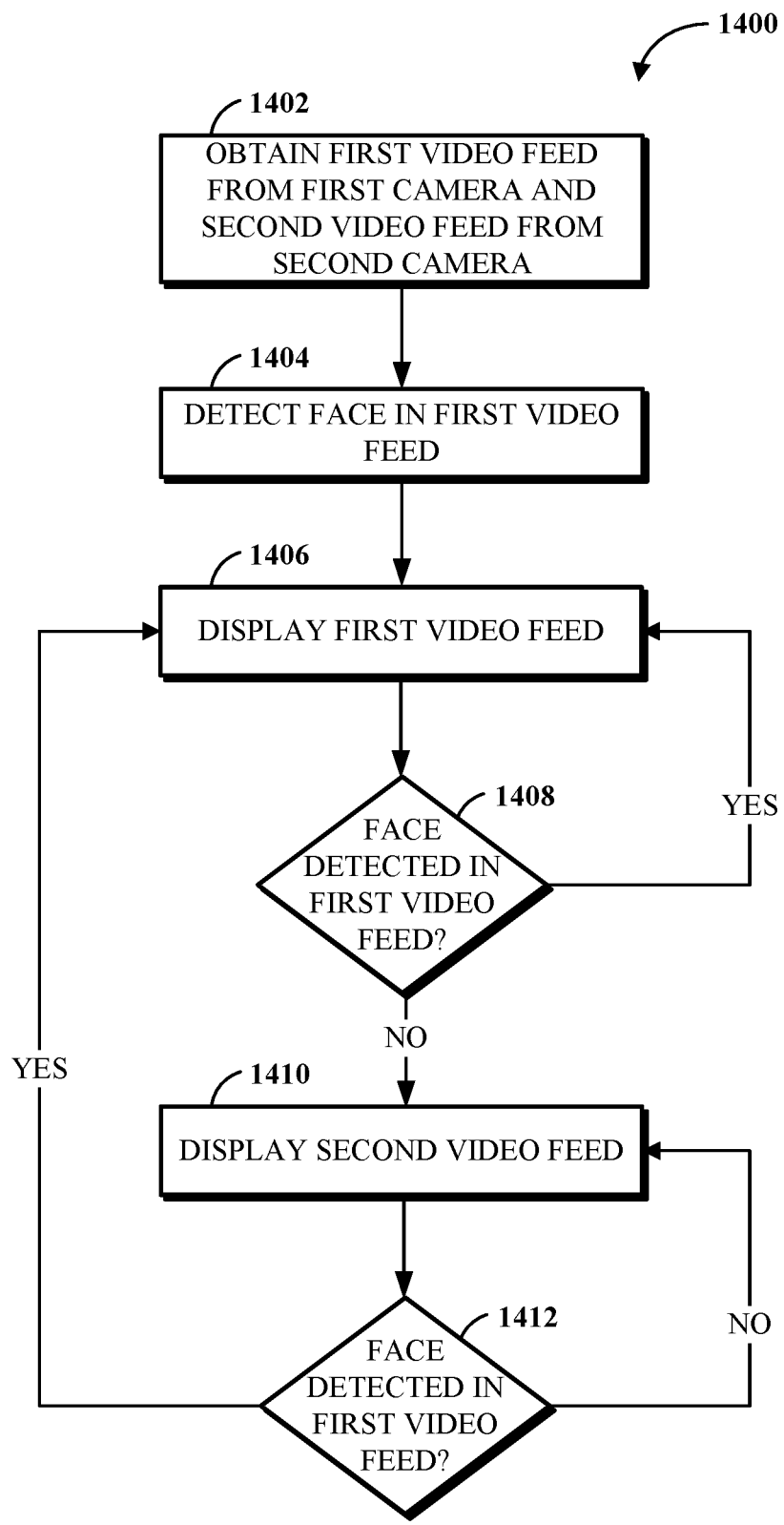
FIG. 14 is a flowchart of an example of another method for automatically switching a video feed from one camera to a video feed from another camera for display in a video conference.

FIG. 14 is a flowchart of an example of another method 1400 for automatically switching a video feed from one camera to a video feed from another camera for display in a video conference. The method 1400 can be executed using computing devices, such as the systems, hardware, and software described with respect to FIGS. 1-9. The method 1400 can be performed, for example, by executing a machine-readable program or other computer-executable instructions, such as routines, instructions, programs, or other code. The steps, or operations, of the method 1400 or another technique, method, process, or algorithm described in connection with the implementations disclosed herein can be implemented directly in hardware, firmware, software executed by hardware, circuitry, or a combination thereof.

For simplicity of explanation, the method 1400 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement method 1400 in accordance with the disclosed subject matter.

At 1402, the method 1400 includes obtaining a first video feed from a first camera, such as camera 802A shown in FIG. 8, for example, and obtaining a second video feed from a second camera, such as camera 802B shown in FIG. 8, for example. In this example, the first camera and the second camera share a location, such as a recording area of a host. The video feeds from the first camera and the second camera may be obtained by a video conference system, such as video conference system 300 shown in FIG. 3. The video feeds from the first camera and the second camera may be obtained by the video conference system via a client, such as client 102 shown in FIG. 1 or clients 308 and 310 shown in FIG. 3. The first video feed from the first camera may have a first FOV and the second video feed from the second camera may have a second FOV. In some examples, the first FOV may partially overlap with the second FOV. In other examples, the first FOV and the second FOV may be non-overlapping FOVs.

At 1404, the method 1400 includes detecting a face in the first video feed. Detecting the face in the first video feed may include identifying an area of the first video feed that may contain a face. A bounding box may be drawn around the identified area. The identified area may be classified as a face based on a probabilistic match when compared to stored faces in a database of faces. In some examples, the identified area may include surrounding area of the detected face. The identified area may be sampled for objects using an ML face detection model. The bounding box may be dynamically resized and configured to track the detected face as it moves in the display area.

At 1406, the method 1400 includes displaying the first video feed. The first video feed may be displayed in a primary area of a display, such as the primary area 902 shown in FIG. 9. The first video feed may be displayed in the primary area of the display based on the detection of a face. Displaying the first video feed in the primary area of the display may be based on a threshold duration of time that the face is detected. For example, if the face is detected for at least two seconds, the first video feed may be displayed in the primary area of the display.

At 1408, the method 1400 includes determining whether the face is detected in the first video feed. This determination may be performed at periodic intervals. If the face is detected at 1408, the method includes continuing the display of the first video feed in the primary area of the display at 1406.

If the face is not detected in the first video feed at 1408, the method 1400 includes displaying 1410 the second video feed. The second video feed may be displayed in the primary area of the display based on the absence of detecting the face in the first video feed. Displaying the second video feed in the primary area of the display may be based on a threshold duration of time that the face is not detected in the first video feed. For example, if the face is not detected for at least two seconds in the first video feed, the second video feed may be displayed in the primary area of the display.

At 1412, the method 1400 includes determining whether a face is detected in the first video feed. This determination may be performed at periodic intervals. If a face is not detected in the first video feed at 1412, the method 1400 includes continuing the display of the second video feed in the primary area of the display at 1410. If a face is detected in the first video feed at 1412, the method 1400 includes switching the display to display the first video feed in the primary area of the display at 1406.

In some examples, the first video feed from the first camera may be minimized to the secondary area of the display when the second video feed from the second camera is displayed in the primary area of the display. In some examples, the first video feed from the first camera may be terminated in the primary area of the display when the second video feed from the second camera is displayed in the primary area of the display.

Figure 15:
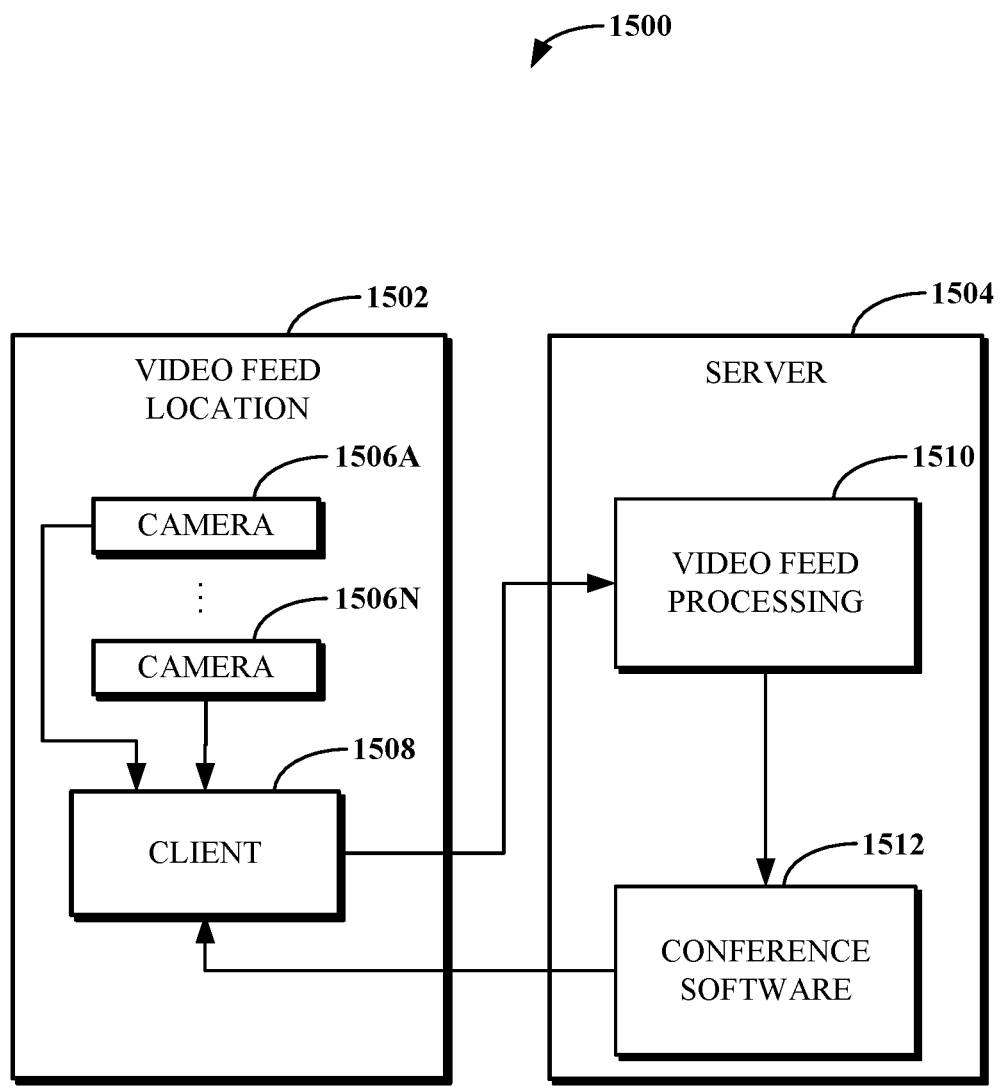
FIG. 15 is a block diagram of an example of a conference system for performing automatic spotlighting of video feeds in a video conference.

FIG. 15 is a block diagram of an example of a conference system 1500 for performing automatic spotlighting of video feeds in a video conference as described in FIGS. 4A-14. The conference system 1500 includes a video feed location 1502 and a server 1504. The example in FIG. 15 shows one video feed location for simplicity and clarity, and it is understood that the conference system 1500 can include multiple video feed locations. The video feed location 1502 may be a host video feed location or a participant video feed location. The video feed location 1502 includes one or more cameras 1506A-1506N and a client 1508. Cameras 1506A-1506N are configured to transmit video streams to client 1508, for example wirelessly or through a wired connection. The video streams from cameras 1506A-1506N may be associated with host video feeds or participant video feeds.

The server 1504 includes a video feed processing tool 1510 and conference software 1512. The video feed processing tool may perform the functions of the thread encoding tool 302 and switching/routing tool 304 shown in FIG. 3. The conference system 1500 enables use of the conference software 1512 by the client 1508. The conference system 1500 may be implemented using one or more servers of the system 100 shown in FIG. 1.

The client 1508 may connect through the server 1504 using one or more input streams from cameras 1506A-1506N to enable users thereof to participate in a conference together using the conference software 1512. The conference software 1512 is software for implementing conferences between users of two or more clients and/or phones. For example, the conference software 1512 can be the conference software described above with respect to the application server 108 of FIG. 1.

The conference software 1512 includes a dedicated conference view for each input stream received and processed at the server 1504. For example, a conference view may be represented within a GUI of the conference software 1512 by a dedicated box for a given participant. The content of the conference view for a given host or participant may be dependent upon the source of the input stream for that host or participant. For example, where a host or participant accesses the conference software 1512 from a client, such as the client 1508, the conference view for the host or participant may include a video output stream transmitted from the conference system for viewing by all participants based on a video input stream received from the client, although the participant may optionally disable video features to suspend the video output stream from being presented in the conference view. In another example, where a participant accesses the conference software 1512 from a phone, the conference view for the participant may be limited to a static image or other default background aspect since there is no video output stream produced for that participant.

The video feed processing tool 1510 receives video input streams the client 1508 and encodes those video input streams using one or more transcoding tools, such as to produce variant streams at different resolutions. The video input streams may be received over a network, for example, the network 114 shown in FIG. 1, or by a direct wired connection, such as using a USB connection or like coupling aspect. After the video input streams are encoded, the encoded streams are directed through applicable network infrastructure and/or other hardware to deliver the encoded streams to the conference software 1512. The conference software 1512 is configured to automatically spotlight video streams using the methods described in FIGS. 10-14 and deliver output video streams representative of the respective encoded streams to each connected client, which receives and decodes the output video streams to output them for display by video output components of the clients, such as within respective conference views of the conference software 1512.

A conference may be referred to as a video-enabled conference in which video streaming is enabled for one or more participants. The enabling of video streaming for a participant of a conference does not require that the participant activate or otherwise use video functionality for participating in the conference. For example, a conference may still be a video-enabled conference where none of the participants joining using clients turns on their video feed for any portion of the conference. In some cases, however, the conference may have video disabled, such as where each participant connects to the conference using a phone rather than a client, or where a host of the conference selectively configures the conference to exclude video functionality.

In some implementations, other software services may be accessible in connection with a conference implemented using the conference system 1500. For example, a conference may include or otherwise integrate functionality for instant messaging, unified messaging, and other types of messaging communications between participants of the conference, such as to facilitate a chat or like virtual conversation between users of those participants. Those other software services may be implemented at the conference system 1500 and/or a different aspect of the system 100.

An aspect includes a method that may include updating a participant video feed. The participant video feed may be updated based on a relevance score of the participant video feed. The relevance score may correspond to an activity of the participant video feed and may be based on a correlation between a first participant activity in the participant video feed and a second participant activity in a second participant video feed. The method may include outputting a display that includes the participant video feed adjacent to the second participant video feed.

An aspect includes a system that includes a server. The server may be configured to update a participant video feed based on a relevance score of the participant video feed. The relevance score may correspond to an activity of the participant video feed and may be based on a correlation between a first participant activity in the participant video feed and a second participant activity in a second participant video feed. The server may be configured to output a display that includes the participant video feed adjacent to the second participant video feed.

An aspect includes a non-transitory computer-readable medium that comprises instructions that when executed by a processor, cause the processor to perform operations. The operations may include updating a participant video feed. The participant video feed may be updated based on a relevance score of the participant video feed. The relevance score may correspond to an activity of the participant video feed and may be based on a correlation between a first participant activity in the participant video feed and a second participant activity in a second participant video feed. The operations may include outputting a display that includes the participant video feed adjacent to the second participant video feed.

In one or more aspects, a second relevance score may be determined that corresponds to the second participant activity. In one or more aspects, the second participant video feed may be added to the spotlight queue when the second relevance score is above a threshold. In one or more aspects, the second participant video feed may be updated to the active spotlight status. In one or more aspects, the relevance score may be compared to the second relevance score. In one or more aspects, the relevance score may be greater than the second relevance score. In one or more aspects, the second participant video feed may be added to the spotlight queue below the participant video feed based on a comparison of the relevance score and the second relevance score. In one or more aspects, the relevance score may be based on a correlation of a first object activity in the participant video feed relative to a second object activity in a host video feed. In one or more aspects, the second participant video feed may be output for display in the spotlight queue when the second relevance score is above a threshold. In one or more aspects, the participant video feed may be output for display in the spotlight queue above the second participant video feed based on the comparison of the relevance score and the second relevance score.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   updating a participant video feed based on a relevance score of the participant video feed that corresponds to an activity of the participant video feed and is based on a correlation between a first participant activity in the participant video feed and a second participant activity in a second participant video feed; and
   outputting a display that includes the participant video feed adjacent to the second participant video feed.

2. The method of claim 1, further comprising:
   determining a second relevance score corresponding to the second participant activity.

3. The method of claim 1, further comprising:
   determining a second relevance score corresponding to the second participant activity; and
   adding the second participant video feed to a spotlight queue when the second relevance score is above a threshold.

4. The method of claim 1, further comprising:
   determining a second relevance score corresponding to the second participant activity;
   adding the second participant video feed to a spotlight queue when the second relevance score is above a threshold; and
   updating the second participant video feed to an active spotlight status.

5. The method of claim 1, further comprising:
   determining a second relevance score corresponding to the second participant activity; and
   comparing the relevance score to the second relevance score.

6. The method of claim 1, further comprising:
   determining a second relevance score corresponding to the second participant activity;
   comparing the relevance score to the second relevance score, wherein the relevance score is greater than the second relevance score; and
   adding the second participant video feed to a spotlight queue below the participant video feed based on the comparison of the relevance score and the second relevance score.

7. The method of claim 1, wherein the relevance score is based on a correlation of a first object activity in the participant video feed relative to a second object activity in a host video feed.

8. A system, comprising:
a server comprising:
a memory configured to store instructions; and
processor configured to execute the instructions, wherein the processor is configured to:
update a participant video feed based on a relevance score of the participant video feed that corresponds to an activity of the participant video feed and is based on a correlation between a first participant activity in the participant video feed and a second participant activity in a second participant video feed; and
output a display that includes the participant video feed adjacent to the second participant video feed.

9. The system of claim 8, wherein the processor is further configured to:
determine a second relevance score corresponding to the second participant activity.

10. The system of claim 8, wherein the processor is further configured to:
determine whether the activity is valid based on a duration of the activity; and
update the participant video feed to an active spotlight status based on a determination that the activity is valid.

11. The system of claim 8, wherein the processor is further configured to:
determine a second relevance score corresponding to the second participant activity;
add the second participant video feed to a spotlight queue when the second relevance score is above a threshold; and
update the second participant video feed to an active spotlight status.

12. The system of claim 8, wherein the processor is further configured to:
determine a second relevance score corresponding to the second participant activity; and
compare the relevance score to the second relevance score.

13. The system of claim 8, wherein the server-processor is further configured to:
determine a second relevance score corresponding to the second participant activity;
compare the relevance score to the second relevance score, wherein the relevance score is greater than the second relevance score; and
add the second participant video feed to a spotlight queue below the participant video feed based on the comparison of the relevance score and the second relevance score.

14. The system of claim 8, wherein the relevance score is based on a correlation of a first object activity in the participant video feed relative to a second object activity in a host video feed.

15. A non-transitory computer-readable medium comprising instructions that when executed by a processor, cause the processor to perform operations comprising:
updating a participant video feed based on a relevance score of the participant video feed that corresponds to an activity of the participant video feed and is based on a correlation between a first participant activity in the participant video feed and a second participant activity in a second participant video feed; and
outputting a display that includes the participant video feed adjacent to the second participant video feed.

16. The non-transitory computer-readable medium of claim 15, further comprising:
determining a second relevance score corresponding to the second participant activity.

17. The non-transitory computer-readable medium of claim 15, further comprising:
determining a second relevance score corresponding to the second participant activity; and
outputting the second participant video feed for display in a spotlight queue when the second relevance score is above a threshold.

18. The non-transitory computer-readable medium of claim 15, further comprising:
determining a second relevance score corresponding to the second participant activity;
outputting the second participant video feed for display in a spotlight queue when the second relevance score is above a threshold; and
updating the second participant video feed to an active spotlight status.

19. The non-transitory computer-readable medium of claim 15, further comprising:
determining a second relevance score corresponding to the second participant activity; and
comparing the relevance score to the second relevance score.

20. The non-transitory computer-readable medium of claim 15, further comprising:
determining a second relevance score corresponding to the second participant activity;
comparing the relevance score to the second relevance score, wherein the relevance score is greater than the second relevance score; and
outputting the participant video feed for display in a spotlight queue above the second participant video feed based on the comparison of the relevance score and the second relevance score.

* * * * *